(12) United States Patent
Suzuki

(10) Patent No.: US 6,707,567 B1
(45) Date of Patent: Mar. 16, 2004

(54) SUPERVISING SYSTEM FOR IMAGE FORMING APPARATUS AND METHOD THEREOF

(75) Inventor: Kobun Suzuki, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/314,939

(22) Filed: May 20, 1999

(30) Foreign Application Priority Data

May 20, 1998 (JP) .......................... 10-155253
Jun. 24, 1998 (JP) .......................... 10-177666

(51) Int. Cl.[7] .............................................. G06K 15/00
(52) U.S. Cl. .......................... 358/1.15; 700/9; 700/17; 700/169
(58) Field of Search ................. 358/1.1–1.9, 1.11–1.18; 399/10–37; 700/9, 17, 27, 28, 169

(56) References Cited

U.S. PATENT DOCUMENTS

| | | | |
|---|---|---|---|
| 5,333,286 A | | 7/1994 | Weinberger et al. .......... 714/47 |
| 5,373,349 A | * | 12/1994 | Ito ................................. 399/1 |
| 5,485,246 A | * | 1/1996 | Hayashi et al. ................ 399/1 |
| 5,673,190 A | * | 9/1997 | Kahleck et al. ................ 700/2 |
| 5,712,972 A | * | 1/1998 | Kakkar .......................... 714/26 |
| 5,802,429 A | * | 9/1998 | Yamashita ...................... 399/8 |
| 5,950,148 A | | 9/1999 | Nakagawa et al. ......... 702/182 |

FOREIGN PATENT DOCUMENTS

| | | |
|---|---|---|
| EP | 0 717 322 | 6/1996 |
| JP | 6-205126 | 7/1994 |
| JP | 9-80987 | 3/1997 |
| JP | 9-130509 | 5/1997 |

* cited by examiner

Primary Examiner—Gabriel Garcia
Assistant Examiner—King Y. Poon
(74) Attorney, Agent, or Firm—Oblon, Spivak, McClelland, Maier & Neustadt, P.C.

(57) ABSTRACT

A supervising system for image forming apparatus includes a central control apparatus, a public communication network connected to the central control apparatus, a communication adaptor connected to the public communication network, and a plurality of image forming apparatus connected to the communication adaptor via a wired or a wireless interface. The supervising system further includes a mobile computer selectively connected to the wired or wireless interface directly or indirectly for executing communications of information between the central control apparatus and itself via the public communication network. Also included is a method of supervising the plurality of image forming apparatus connected to the central control apparatus via the public communication network, including the steps of selectively connecting, either directly or indirectly, a mobile computer to a communication adaptor connected to the public communication network for executing communications of information between the central control apparatus and the mobile computer.

32 Claims, 31 Drawing Sheets

Fig. 5

| SEQ No. | User Name | Model Name | Call-Classification | Data-Arrival-Time | Elapsed-Time (Minute) | CE-delivering Status | ... |
|---|---|---|---|---|---|---|---|
| 0005 | SSS Business Concern | FT-7000 | SC301 | 09:10 | 5 | Arrival | |
| 0006 | | MF-250F | SC100 | 09:10 | 20 | Operation Start | |
| 0007 | TTT Store | FT-5500 | SC102 | 09:11 | 15 | – | |
| ... | | | | | | | |

Fig. 6

| SEQ No. | User ID | Model Name/ Model Number | Call-Classification | Data-Arrival-Time | Elapsed-Time (Minute) | CE-Delivering-Status | ... |
|---|---|---|---|---|---|---|---|
| 0005 | XX...03 | XXXXX | 301 | 09:10 | 5 | 01 | |
| 0006 | XX...19 | XXXXX | 100 | 09:10 | 20 | 02 | |
| 0007 | XX...50 | XXXXX | 102 | 09:11 | 15 | 00 | |
| ... | | | | | | | |

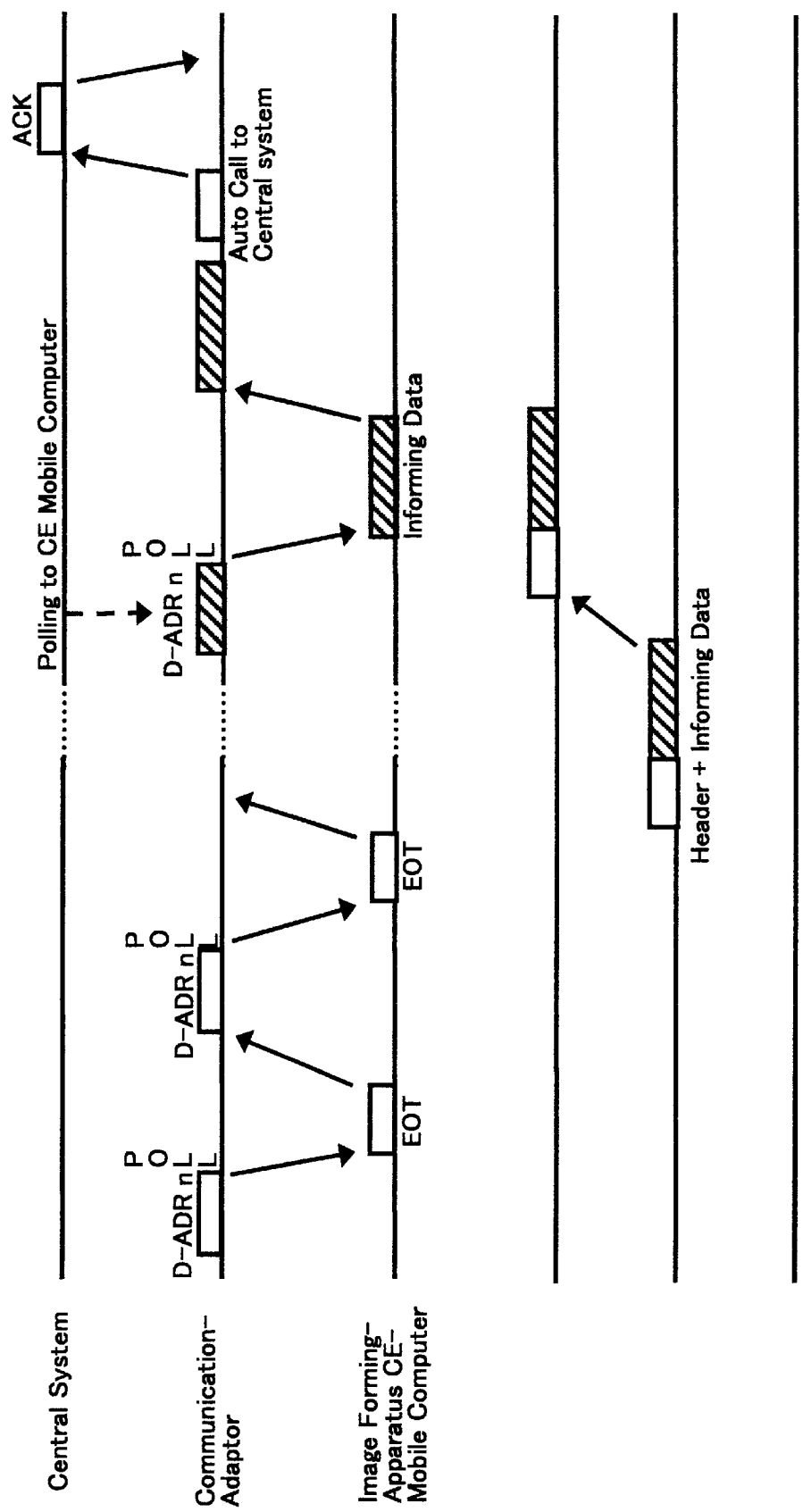

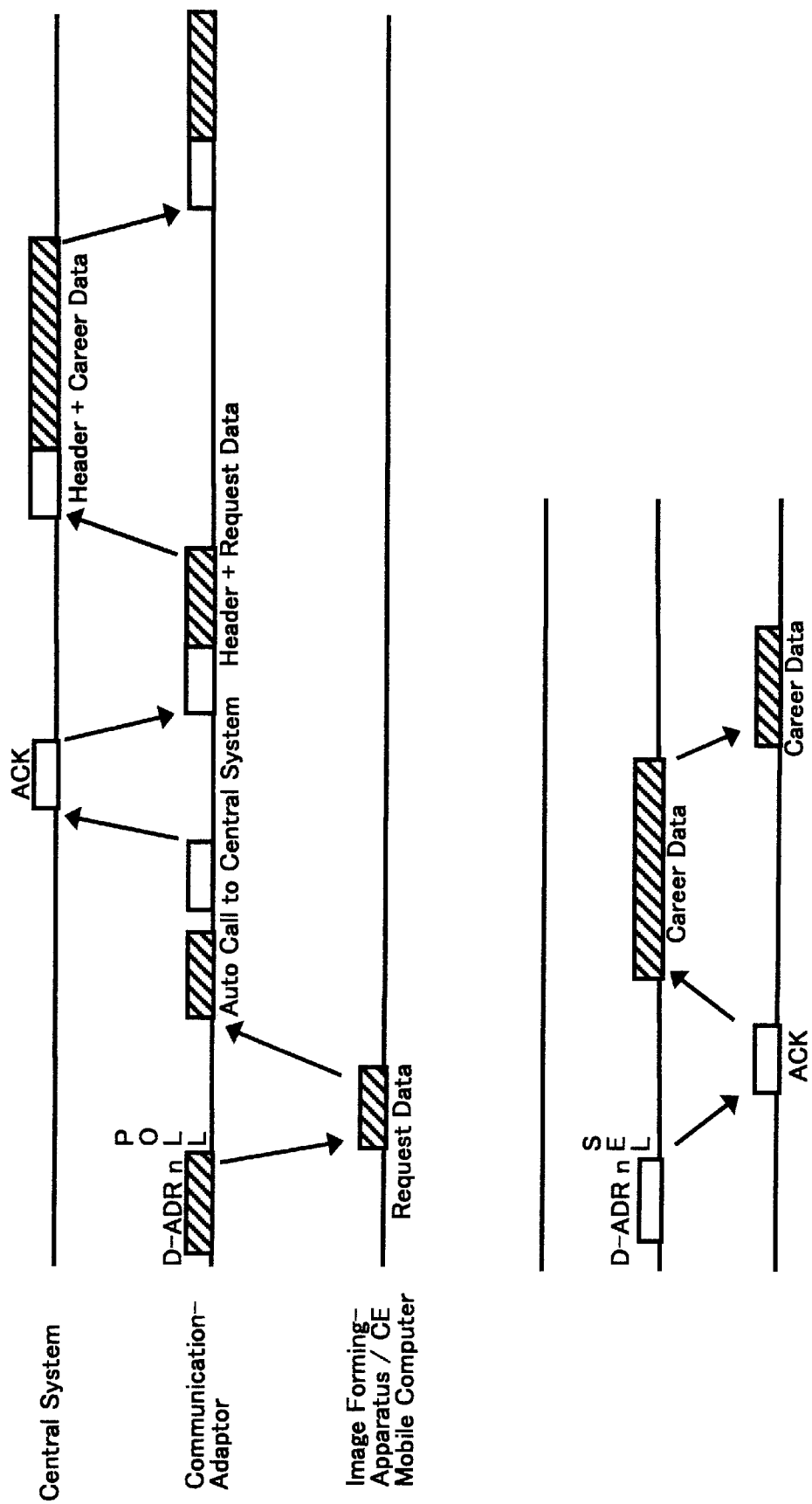

Fig. 11

| No. | Position Code | Name |
|---|---|---|
| 1 | XX····11 | Fixing |
| 2 | XX····12 | Side Feeding Path |
| 3 | XX····13 | First Feeding Unit |
| ⋮ | ⋮ | |

Fig. 14

| Drawing Number | Parts Number | Name |
|---|---|---|
| . | | |
| . | | |
| . | | |
| 20 | XX····X0 | Guide Pick up |
| 21 | XX····X1 | Arm Pick up Assembling |
| 22 | XX····X2 | Stopper Feed Assembling |
| 23 | XX····X3 | Shaft Feed |
| 24 | XX····X4 | Guide Feed Up Stair |
| . | . | . |
| . | . | . |
| . | . | . |

Fig. 15

| SC No. | SC Item |
|---|---|
| . | |
| . | |
| . | |
| 101 | Illumination System Error |
| 102 | Home Position Error |
| 103 | XX Sensor Abnormal |
| . | |
| . | |
| . | |

Fig. 16

| Cause Code | Contents |
|---|---|
| . | |
| . | |
| . | |
| 211 | Stain |
| 212 | Unit·Parts Damage |
| 213 | Screw looseness |
| . | |
| . | |
| . | |

Fig. 17

| Code No. | Repairing Contents |
|----------|--------------------|
| 002      | Cleaning           |
| 003      | Unit·Parts Exchange |
| .        |                    |
| .        |                    |
| .        |                    |
| 201      | Voltage Amount Adjusting |

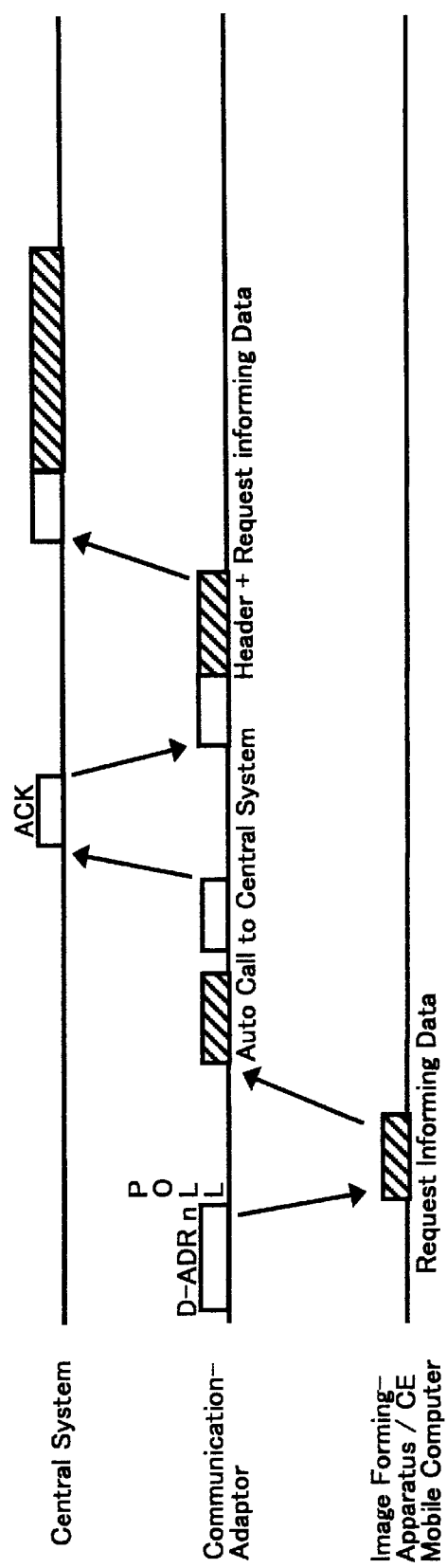

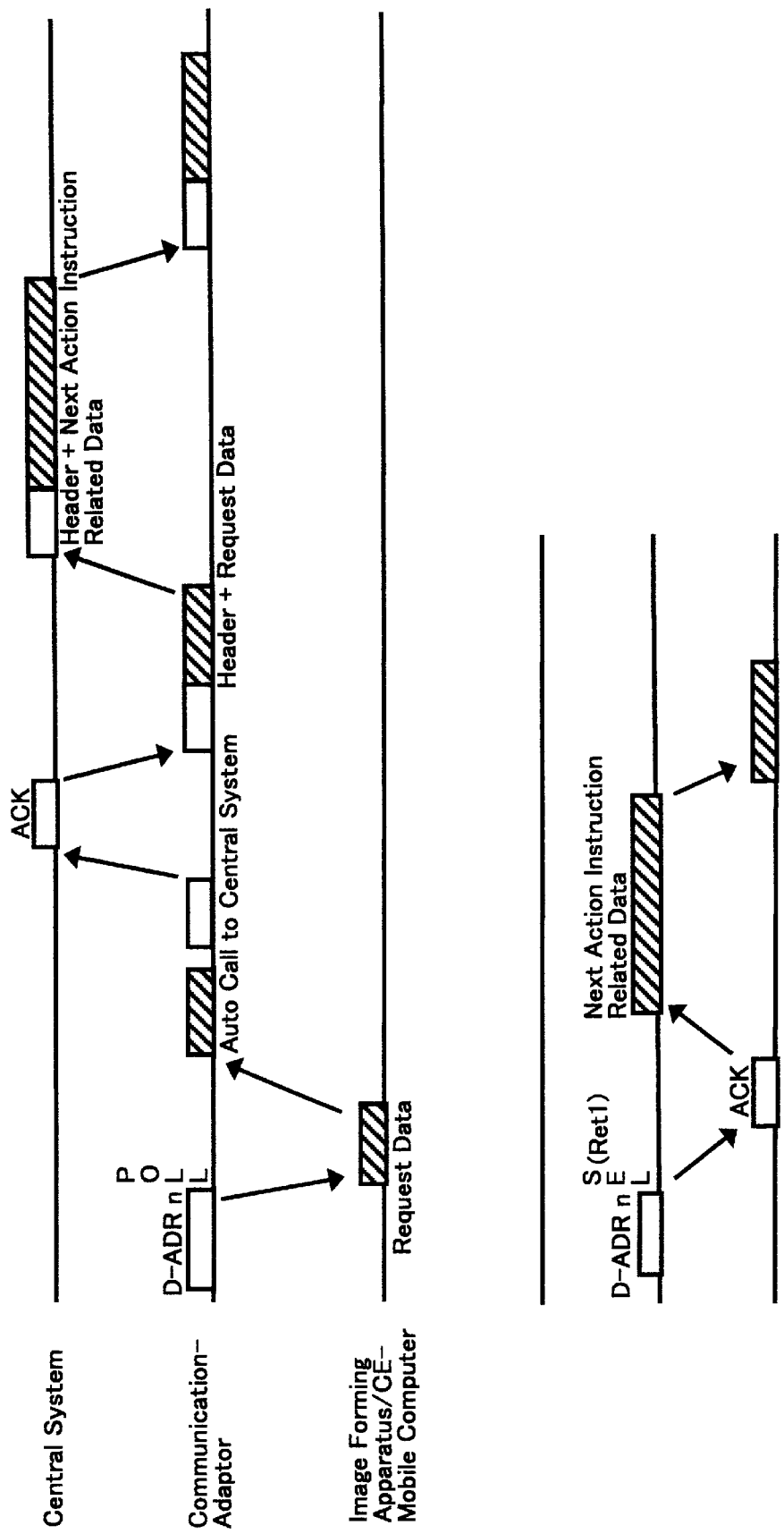

Fig. 24

| SC Number Table |
|---|
| 108 |
| 115 |
| . |
| . |
| . |
| 511 |

When SC is recovered & Corresponding OA Machine does not Operate

When SC is going & Corresponding OA Machine Operates

When SC is going & Corresponding OA Machine does not Operate

Fig. 28

| SEQ No. | User ID | Model Code | Call-Classification | Data-Arrival-Time | Present-Condition-Code | . . . | Erase Flag |
|---|---|---|---|---|---|---|---|
| 0005 | XX・・・03 | XXXXX | 301 | 09 : 10 | 5001 | | 1 |
| 0006 | XX・・・19 | XXXXX | 100 | 09 : 10 | 5001 | | 1 |
| 0007 | XX・・・50 | XXXXX | 102 | 09 : 11 | 5001 | | 0 |
| ・・・ | | | | | | | |

Fig. 29

| SEQ No. | User Name | Model Name | Call-Classification | Data-Arrival-Time | Present-Condition |
|---|---|---|---|---|---|
| 0005 | Co; Ltd., RRR | FT-7000 | SC301 | 09:10 | During Remote-Recovering |
| 0006 | SSS Business Concern | MF-250F | SC100 | 09:10 | During CE-Delivering |
| 0007 | TTT Store | FT-5500 | SC102 | 09:11 | During Remote-Recovering |
| ... | | | | | |

Fig. 30

| User ID | SEQ No. | Year/Month/Data | Model Machine Number | Call-Classifi-cation | Dealing-Code | Unit·Parts Code | Result-Code |
|---|---|---|---|---|---|---|---|
| ···01 | 0001 | 980301 | XXXXX1000 | 301 | 002 | | 2-0 |
| | 0002 | 980310 | XXXXX3550 | 100 | 009 | XYY-5678 | 1-0 |
| | 0003 | 980303 | XXXXX1000 | 302 | 009 | YYX-1234 | 1-0 |
| | 0004 | 980304 | XXXXX1000 | 301 | 002 | | 2-0 |
| | 0005 | 980305 | XXXXX1000 | 301 | 002 | XYX-2345 | 2-0 |
| | 0006 | 980311 | XXXXX1000 | 303 | 009 | | 2-0 |
| | ··· | | | | | | |

SUPERVISING SYSTEM FOR IMAGE FORMING APPARATUS AND METHOD THEREOF

BACKGROUND OF THE INVENTION

1. Field of the Invention

This invention relates to a supervising system for image forming apparatus, and which includes a central control apparatus and a plurality of image forming apparatus connected to the central control apparatus via a communication network. More particularly, the present invention relates to a supervising system for image forming apparatus, and which is capable of selectively connecting a mobile computer of a service person with the communication network at a user site.

2. Discussion of the Background

In the past, many image forming apparatus supervising systems have been proposed. The conventional image forming apparatus supervising systems generally include a plurality of office automation (hereinafter referred to as an OA) machines, such as image forming apparatus respectively disposed at a plurality of user sites, and a central control apparatus connected to each of the image forming apparatus and disposed at a sales dealer or a service center for forming a network.

The conventional image forming apparatus supervising system generally totals an amount of a consumable item of the image forming apparatus, which has been used by a user at a remote site, and communicates maintenance related information between the image forming apparatus and a central control system for a maintenance of the image forming apparatus under a remote control. The totaled amount can be a number of copysheets, and the maintenance information can be an automatic call from the image forming apparatus to the central supervising system, which is made as a result of self-diagnosis on the image forming apparatus. Further, the maintenance information can be an adjusting instruction for adjusting a device of the image forming apparatus, and which is executed by getting an access to the image forming apparatus from the central control system.

Instead of visiting or making a telephone call to the user, the conventional image forming apparatus supervising system using its remote operation generally reads, for example, a total number of copysheets used by the user from a copy counter of the image forming apparatus to make a bill under a maintenance free contract exchanged between the supplier and the user. Further, when the service person arrives at the user site to repair, adjust and check the image forming apparatus, the service person generally informs a service center before they start the above operations, and when they complete the operations.

However, since the service person generally can not freely use a user's telephone when informing the service center of the start or completion of an operation, the service person is required to use an external public telephone. Even if it is possible for the service person to use the user's telephone, since an operator working at the service center sometimes is not seated or working in a location to receive a telephone call, a contact is sometimes not smoothly executed.

To solve such a problem, the conventional image forming apparatus connected to a supervising system includes an operation start input device for inputting information indicating a start of a service person's operation, an operation end inputting device for inputting information indicating an end of a service person's operation, and an information transmitting device for transmitting the above-noted information to the central control apparatus, as is described in Japanese Patent Application Laid Open Number 8-331355. Thus, the service person can contact the operator of the service center by operating the user's image forming apparatus when informing the start and the completion of the operation without using either the user's telephone or a public telephone.

However, since the service person cannot input information indicating the operation start to the image forming apparatus during an image formation process, the conventional image forming apparatus supervising system can not quickly inform the service center of the input information during the image formation process. Further, since each user's image forming apparatus is required to employ the above-mentioned informing devices, it generally increases costs.

The conventional image forming apparatus supervising system further includes the below-described problems.

First, the service person is generally required to make a prescribed preparation before visiting the user having a problem with the image forming apparatus. For example, the service person is required to obtain history information about the user's image forming apparatus, which is useful for repairing a problem and for maintaining the apparatus, such as adjusting and checking the image forming apparatus. Further, the service person generally has trouble in carrying the information to the user. It is also sometimes difficult to obtain history information when it is required.

Second, since the service person has to bring a service manual for the user's image forming apparatus, it is cumbersome for the service person to obtain and carry such manuals. Further, since several service manuals are generally required when visiting several users, it is generally difficult for the service person to bring all the service manuals.

Third, when the service person requests for several types of service manuals to a prescribed service center using a telephone from a user site, the service person can receive the service manuals via a facsimile located near the user, and refer to those service manuals. However, this is cumbersome for either the service person or the operator of the service center.

Fourth, when the service person completes a repair operation for a user's image forming apparatus and returns to his or her office, the service person is generally required to generate reports describing the results of the repairing operation, a name of an exchanged unit, names of parts, and so on. The service person then requests the operator of the service center to input the report information to a central computer, so that a stock of consumable items, such as an exchangeable unit, parts or the like can be controlled. However, making reports is generally burdensome for the service person, and the input operation is also burdensome for the operator. Further, since a particular computer for the input is required, the cost of equipment generally increases.

Fifth, the service person is generally required to check with the service center about his or her next scheduled appointment using a telephone when a presently executed repair of an image forming apparatus is complete. However, it is time consuming and complex to send related detailed information, such as a user site destination, a section, a person in charge of the user and so on.

Further, in the conventional image forming apparatus supervising system, information indicating a problem occurred in an OA machine, such as an image forming apparatus, is generally automatically informed to a central control system from the image forming apparatus itself. In such a case, the central system generally determines if the problem can be solved by remotely resetting the image forming apparatus, and automatically transmits a reset instruction to the image forming apparatus based on the determination. The image forming apparatus then executes a reset operation to solve the problem occurred therein based on the reset instruction.

Further, the below described operations are generally performed by an operator operating a computer at the central system.

First, the operator erases problem information stored in the central system when a problem which occurred in the image forming apparatus of the user is solved by the reset instruction. Second, the operator is required to determine if a problem can be erased by the reset instruction when receiving problem information from a user site. Third, the operator is required to erase the problem information from a display of a computer of the central system, and maintain the problem information as problem history information.

However, according to these operations, a heavy burden may be imposed on the operator. In particular, due to an increase in data processing times according to an increase in number of image forming apparatus connected to the supervising system, a burden on the operator becomes excessively heavy.

Further, the conventional image forming apparatus supervising system generally takes a statistic of times of the above-mentioned recovery executed to a prescribed image forming apparatus to determine if the service person is to be sent thereto. If the service person is to be sent, the operator is required to deliver the service person. Thus, a burden of the service person increases.

SUMMARY OF THE INVENTION

Accordingly, an object of the present invention is to provide a novel supervising system for image forming apparatus and method thereof.

These and other objects are achieved by a supervising system for image forming apparatus including a central control apparatus, a public communication network connected to the central control apparatus, a communication adaptor connected to the public communication network, a plurality of image forming apparatus connected to the communication adaptor via a wired or a wireless interface, and a mobile computer selectively connected to the wired or wireless interface directly or indirectly for executing communications of information between the central control apparatus and itself via the public communication network.

In another embodiment, the mobile computer may include an operation status information inputting device for inputting operation status information related to an operation status of the service person, and an operation status information informing device for informing the operation status information to the central control apparatus.

In still another embodiment, the mobile computer may include an operation history (i.e., career) information inputting device for inputting requested operation history information, and an operation history information informing device for informing the requested operation history information to the central control apparatus. Further, the central control apparatus may include an operation history information storing device for storing operation information related to an operation executed by the service person for each of the plurality of image forming apparatus when receiving the operation information from each of the plurality of image forming apparatus, a reading device for reading prescribed operation history information from the operation history information storing device when receiving a request for the operation history information from the mobile computer, and an operation history information transmitting device for transmitting the requested operation history information to the mobile computer.

In yet another embodiment, the mobile computer may include a service manual information request inputting device for inputting service manual information request information, and a service manual information request informing device for informing the service manual information request information to the central control apparatus. In addition, the central control apparatus may include a service manual information storing device for storing service manual information for each of the plurality of image forming apparatus, a reading device for reading prescribed service manual information from the service manual information storing device when receiving a request for the prescribed service manual information from the mobile computer, and a service manual information transmitting device for transmitting the prescribed service manual information to the mobile computer.

In yet another embodiment, the mobile computer may include an image forming apparatus designating device for designating a prescribed image forming apparatus, which is to receive the service manual information from the central control apparatus, and which prints the information. Further, the central control apparatus transmits the service manual information to the prescribed image forming apparatus.

In yet another embodiment, the mobile computer may include an operation result information inputting device for inputting operation result information, and an operation result information informing device for informing the central control apparatus of the operation result information.

In yet another embodiment, the mobile computer may include a next user inquiry request information inputting device for inputting next user inquiry request information related to an inquiry of a next user to visit, and a next user inquiry request information informing device for informing the central control apparatus of the next user inquiring request information. In addition, the central control apparatus may include an action schedule information storing device for storing information related to an action schedule of each service person, an action schedule information reading device for reading prescribed action schedule information from the action schedule information storing device when receiving next user inquiry request information from the mobile computer, and an action schedule information transmitting device for transmitting the prescribed action schedule information corresponding to the next user inquiry request information to the mobile computer.

In yet another embodiment, the supervising system for image forming apparatus may include a problem informing device for informing a problem which may have occurred in each of the image forming apparatus to the central control apparatus by automatically calling the central control apparatus by itself, a reset determination device for determining if the image forming apparatus having the problem can be automatically reset when receiving the problem, a reset instruction transmitting device for transmitting a reset instruction from the central control apparatus to the image forming apparatus if the determination of the reset determination device is positive, a resetting device for resetting the image forming apparatus when receiving the reset instruction from the central control apparatus, a reset completion determining device for determining if the reset operation is completed by the image forming apparatus, and a problem information erasing device for automatically erasing the problem information stored in the problem information storing device disposed in the central control system, if the determination of the reset completion determining device is positive.

In yet another embodiment, the supervising system may include a problem information erasing device controller for controlling the problem information erasing device to selectively erase the problem information from the display, and store the problem information in the problem information storing device as a problem history for the prescribed image forming apparatus before erasing thereof.

In yet another embodiment, the central control apparatus displays or prints out a message requesting that a prescribed image forming apparatus needs to be repaired by a service person immediately, if receiving a problem information from the prescribed image forming apparatus after a prescribed number of times of the reset instruction has been transmitted to the prescribed image forming apparatus.

In another embodiment, the present invention is related to a method of supervising a plurality of image forming apparatus connected to the central control apparatus via the public communication network, including the steps of selectively connecting, either directly or indirectly, a mobile computer to a communication adaptor connected to the public communication network for executing communications of information between the central control apparatus and the mobile computer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 is a chart that illustrates an example of contents of a problem information file illustrated in FIG. 2, which is to be displayed on a display of the client computer;

FIG. 6 is a chart that illustrates an example of a display of contents of the problem file illustrated in FIG. 5;

FIG. 8 is a chart that explains a sequence of data communication between the mobile computer and the central system illustrated in FIG. 1, when the operation status is reported by the service person from the user site;

FIG. 10 is a chart that explains a sequence of data communication between the mobile computer and the central system, when operation history information is requested by the service person;

FIG. 11 is a chart that illustrates an example of a unit list to be displayed on a display of the mobile computer;

FIG. 14 is a chart that illustrates a parts number/drawing number list for disassembling and assembling of a prescribed unit, information of which is stored in a maintenance manual database illustrated in FIG. 2;

FIG. 15 is a chart that illustrates an example of a service call code table stored in a hard disk drive illustrated in FIG. 2;

FIG. 16 is a chart that illustrates one example of a problem cause code table stored in the hard disk drive illustrated in FIG. 2;

FIG. 17 is a chart that illustrates one example of a problem dealing code table stored in the hard disk drive illustrated in FIG. 2;

FIG. 19 is a chart that illustrates one example of a sequence of data communication between the mobile computer and the central system, when the operation result is reported by the service person to the central control system;

FIG. 21 is a chart that illustrates a sequence of data communication between the mobile computer and the central system, when the service person makes an inquiry of the next action schedule to the central control system;

FIG. 24 is a chart that illustrates one example of contents of a problem number table stored in the central system;

FIG. 28 is a chart that illustrates one example of contents of a problem information file included in the central system;

FIG. 29 is a chart that illustrates one example of problem information displayed on a display of the central system;

FIG. 30 is a chart that illustrates one example of contents of a problem history information included in the central system.

DESCRIPTION OF THE PREFERRED EMBODIMENTS

Figure 1:
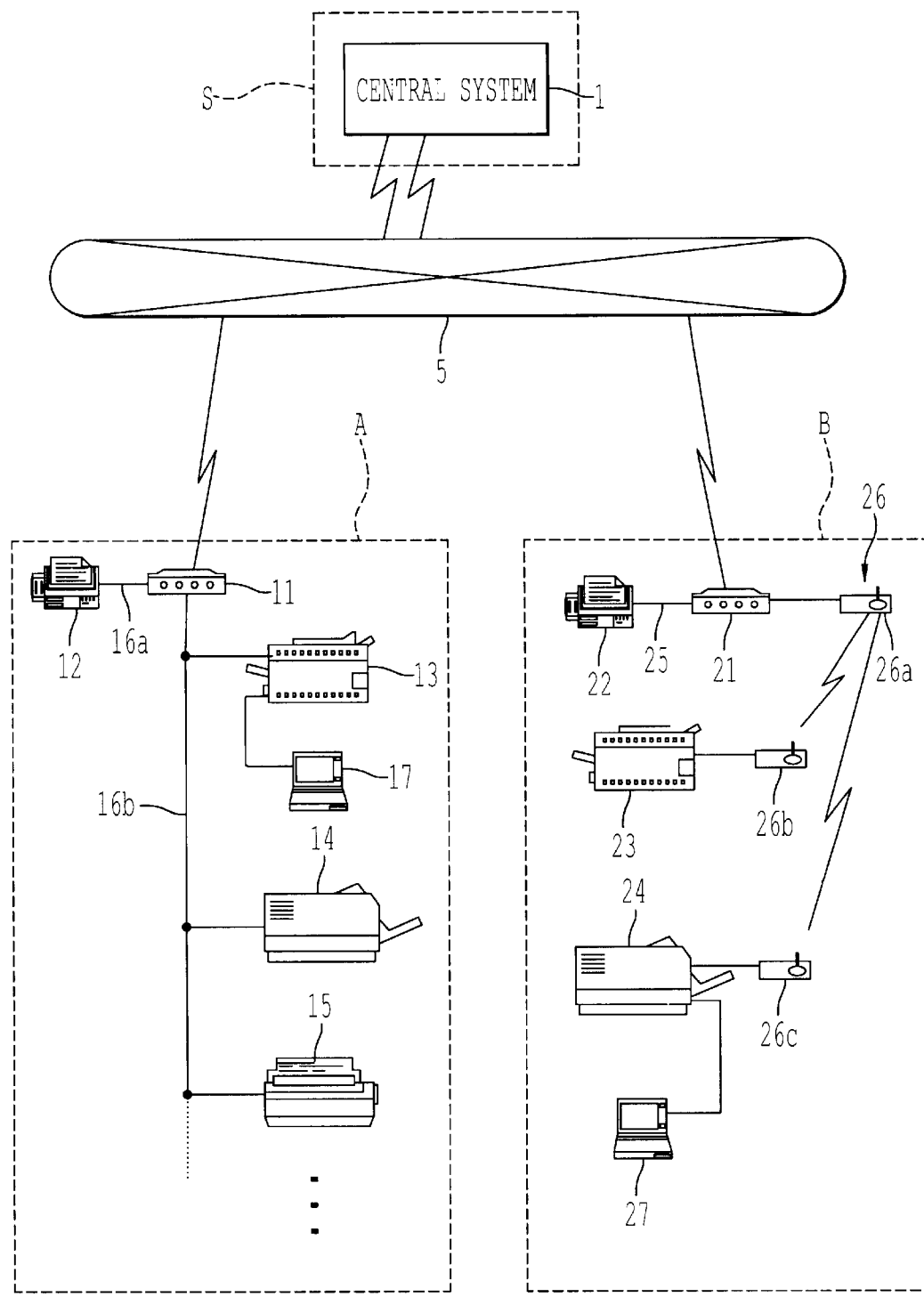
FIG. 1 is a chart that illustrates an example of a structure of a supervising system for image forming apparatus of the present invention.

Hereinbelow, embodiments of the present invention are explained referring to the several drawings, wherein like reference numerals designate identical or corresponding parts throughout the several views.

FIG. 1 is a block chart illustrating one example of a supervising system for image forming apparatus of the present invention. The image forming apparatus supervising system may include a central system 1 as a central control apparatus, and a plurality of OA machines disposed at user sites A and B, for example. A plurality of converters are disposed at the user sites (not shown).

A communication adapter 11 is employed in the user site A, which is connected to the central system 1 disposed at a service center S via a public communication network 5.

A plurality of types of image forming apparatus, such as a facsimile (hereinafter referred to as a FAX), a copier 13, a printer 14 and a duplicator 15 are also disposed in the user site A as OA machines. Further, a plurality of wired interfaces (hereinafter referred to as I/Fs) are included for connecting each image forming apparatus with the communication adapter 1.

A laptop computer or the like 17 used as a mobile computer (hereinafter referred to as a CE mobile computer) may be connected to the I/F 16b through the image forming apparatus 13. The CE mobile computer may be used by a service person (hereinafter referred to as a CE) when repairing or checking and adjusting (i.e., maintaining) the image forming apparatus.

In another user site B, a communication adapter 21 is connected to the central system 1 of the service center S through the public communication network 5, and plurality of types of image forming apparatus, such as a FAX 22, a copier 23, a printer 24 and so on are included. Further, a wired I/F 25 is employed to connect the FAX 22 with the communication adapter 21. A wireless I/F 26 is also employed to connect the copier 23 and the printer 24 with the communication adapter 21.

The wireless I/F 26 as a radio station may include wireless devices 26a, 26b and 26c respectively connected to the communication adapter 21, the copier 23 and the printer 24. A CE mobile computer 27 having almost a same function as the CE mobile computer 17 may be connected to the wireless I/F 26 through the printer 24.

Figure 2:
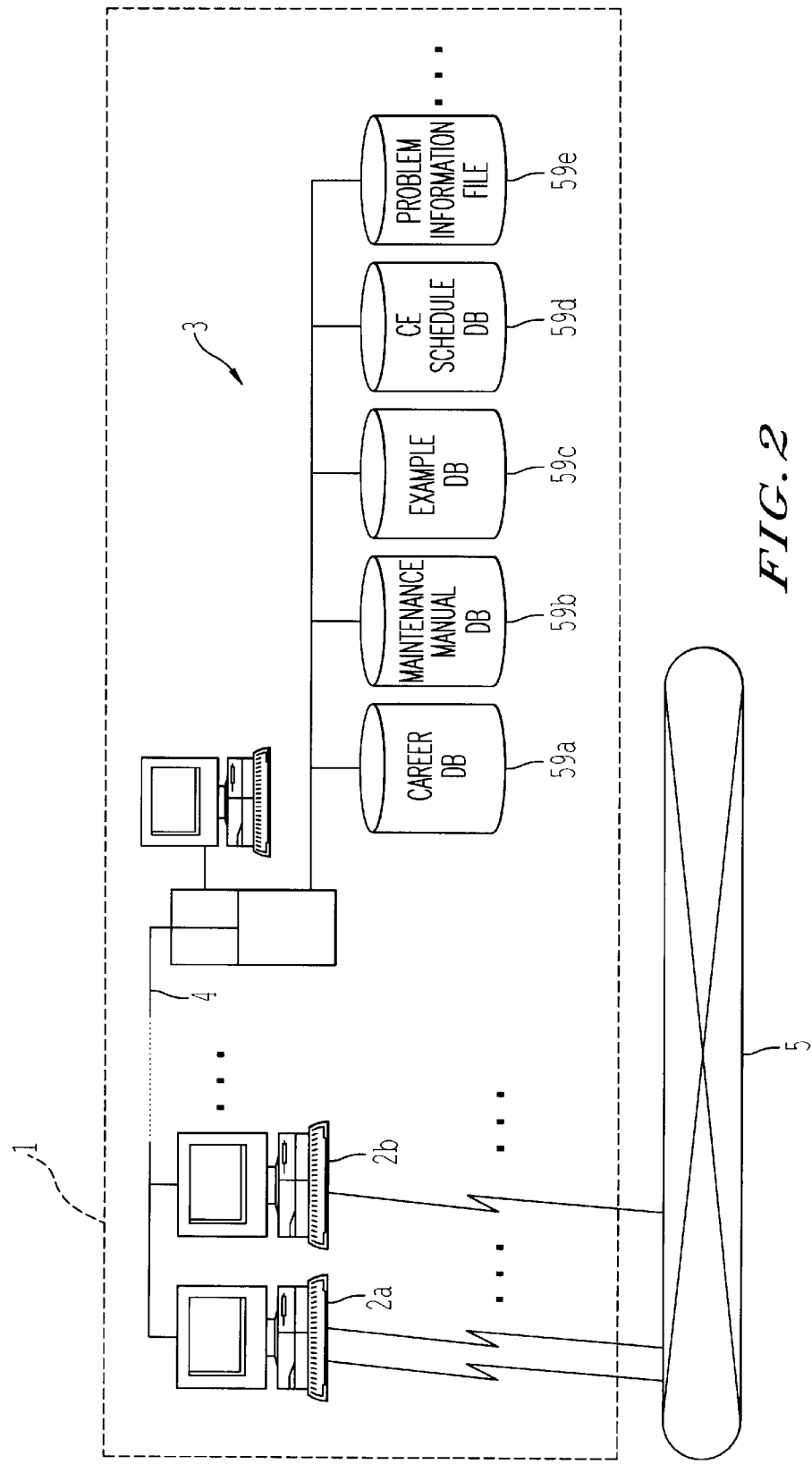
FIG. 2 is a chart that illustrates an example of a structure of a central system illustrated in FIG. 1.

FIG. 2 is a block chart illustrating a constitution of the central system 1. The central system 1 may include a plurality of client computers 2a, 2b and so on, a server 3, and a network 4, such as a LAN (Local Area Network).

Figure 3:
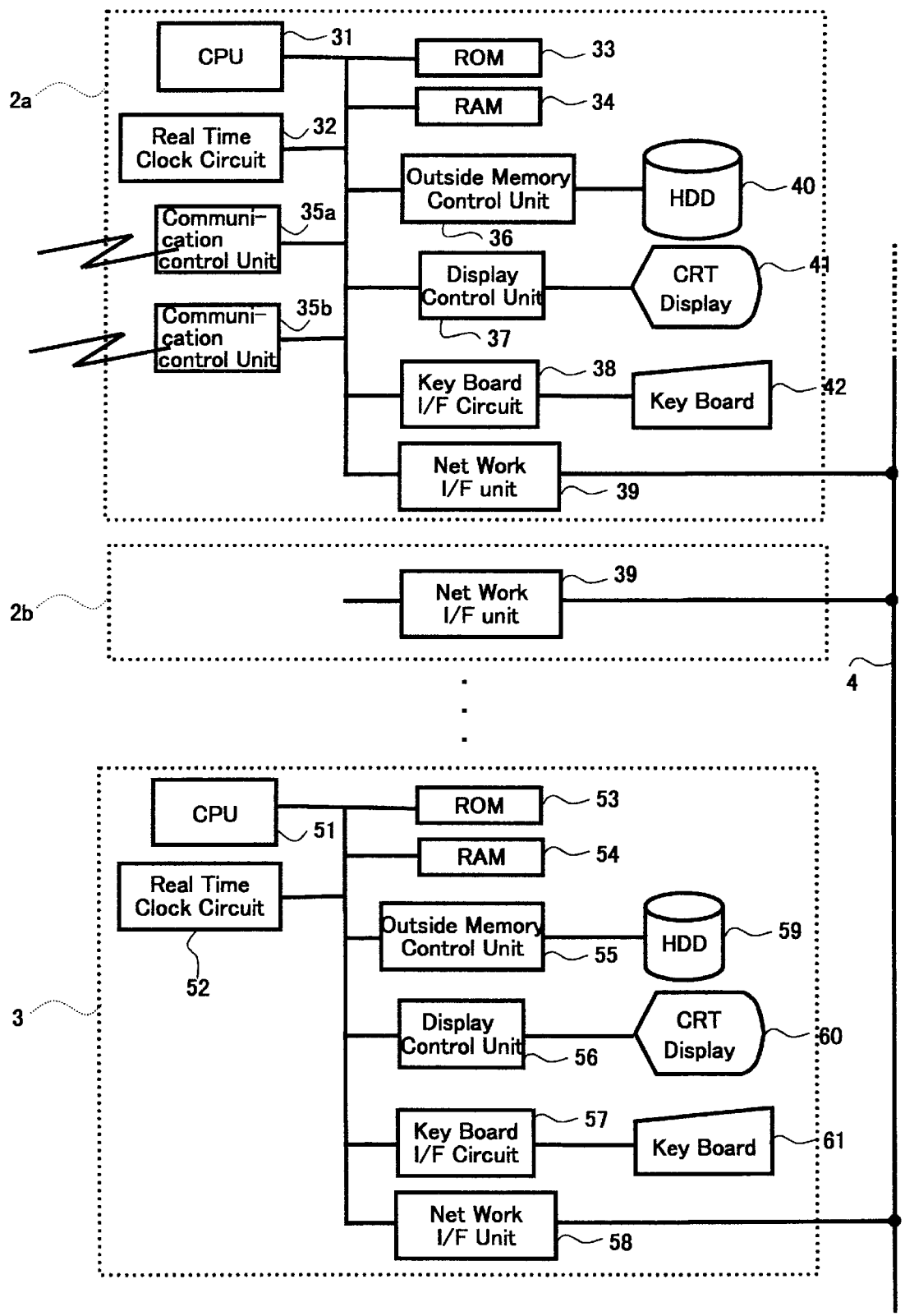
FIG. 3 is a block chart that illustrates an example of client computers and a server each located at the central system illustrated in FIG. 2.

FIG. 3 is a block chart illustrating the client computers 2a, 2b and so on, and the server 3. The client computer 2a may include a central processing unit (hereinafter referred to as a CPU) 31, a real time clock circuit 32, a read only memory (hereinafter referred to as a ROM) 33, a plurality of communication control units 35a, 35b and so on, and an outside memory control unit 36. The client computer 2a may further include a display control unit 37, a keyboard I/F circuit 38, a network I/F unit 39 and a hard disk drive (hereinafter referred to as a HDD) 40. The client computer 2a may further include a cathode ray tube (hereinafter referred to as a CRT) display 41 and a keyboard 42 and so on.

Since the client computer 2b has almost a same construction as the client computer 2a, an explanation and illustration of each portion except for a network I/F unit 39 is omitted. Further, since other client computers in the central system 1 have almost a same construction as the client computer 2a, both the illustration and the explanation are omitted.

The CPU 31 may function as a central processing apparatus for totally controlling the client computer 2a under a control program stored in the ROM 33. The real time clock circuit 32 may generate time information. The CPU 31 may detect a present time by reading the time of the real time clock. The ROM 32 may include variety of static data, such as a control program to be only read and used by the CPU 31.

The RAM 34 may be a readable/writeable work memory, for example, to be used by the CPU 31 when the CPU 31 processes data. The communication control units 35a, 35b may communicate with outside machines via the public communication network 5. The outside memory control unit 36 may execute interface control between the HDD 40 and itself. Further, the display control unit 37 may execute interface control between the CRT display 41 and itself. The keyboard I/F circuit 38 may execute interface control between the keyboard 42 and itself. The network I/F unit 39 may execute interface control between other client computers, such as client computer 2b connected to the network 4, or the server 3.

The server 3 may include a CPU 51, a real time clock 52, a ROM 53, a RAM 54, and an outside memory control unit 55. The server may further include a display control unit 56, a keyboard I/F circuit 57, and a network I/F unit 58. The server may further include a HDD 59, a CRT display 60, and a keyboard 61 and so on.

The CPU 51 may be a central processing apparatus for totally controlling the server 3 under the control program stored in the ROM 53. The real time clock circuit 52 may generate present time information. The CPU 51 may read the time information from the real time clock circuit 52 to detect a present time. The ROM 53 may store a variety of static data, such as a control program to be used by the CPU 51.

The RAM 54 may be a readable/writeable memory used by the CPU 51 when the CPU 51 processes data. The outside memory control unit 55 may execute interface control between the HDD 59 and itself. The HDD 59 may store history data base (hereinafter referred to as DB) 59a, maintenance manual DB 59b, an example DB 59c, a CE schedule DB 59d, and a problem information file 59e, as illustrated in FIG. 2.

The display control unit 56 may execute interface control between the CRT display 60 and itself. The keyboard I/F circuit 57 may execute interface control between keyboard 61 and itself. The network I/F unit 58 may execute interface control between the client computers 2a and 2b and itself.

Figure 4:
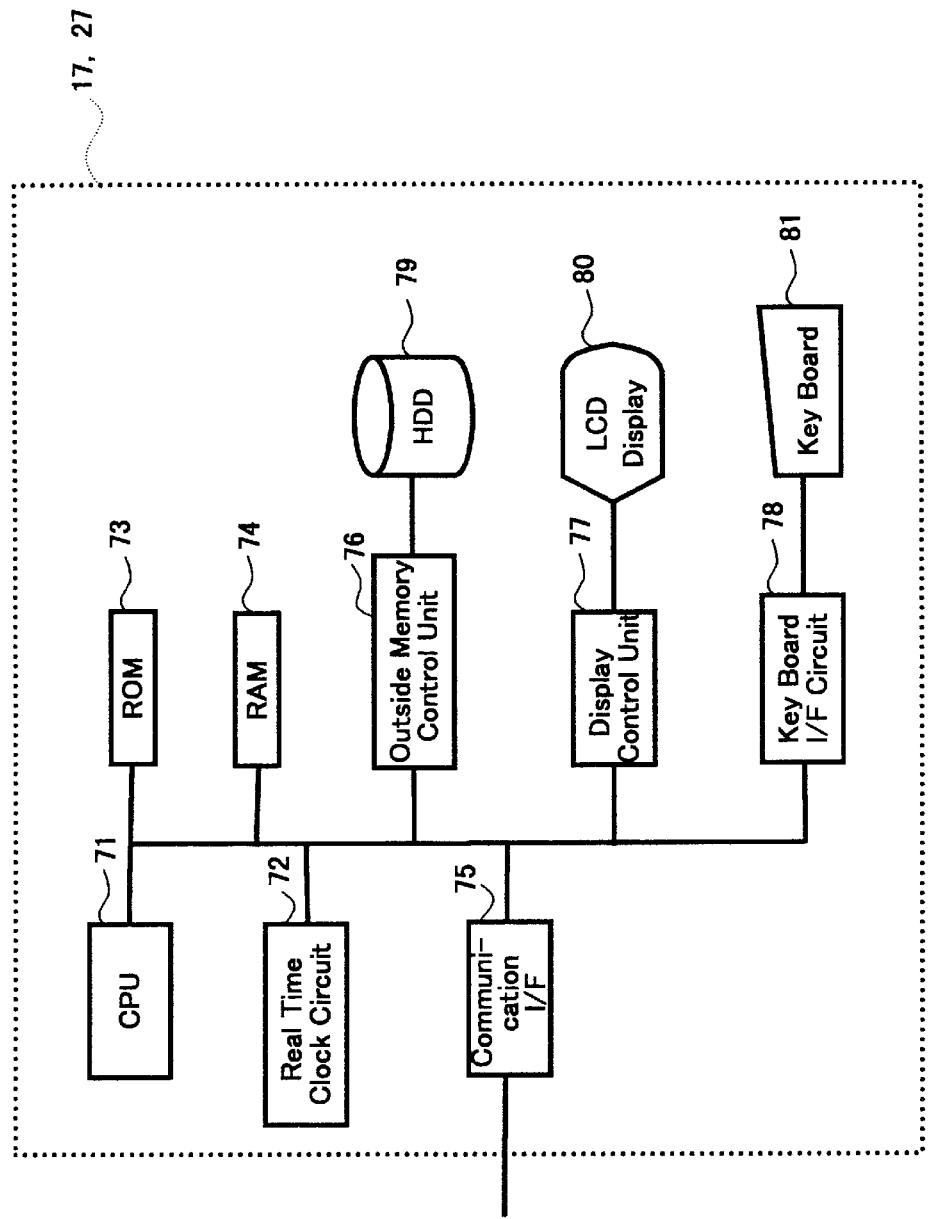
FIG. 4 is a block chart that illustrates an example of a construction of a mobile computer illustrated in FIG. 1.

FIG. 4 is a block chart illustrating a construction of each of the CE mobile computers 17 or 27. The CE mobile computers 17 and 27 may respectively include a CPU 71, a real time clock circuit 72, a ROM 73, and a RAM 74. The CE mobile computers 17 and 27 may respectively include a communication I/F 75, an outside memory control unit 76, and a display control unit 77. In addition, the CE mobile computers 17 and 27 may respectively include a keyboard I/F circuit 78, a HDD 79, a LCD display 80, and a keyboard 81. The CPU 71 may be a central processing apparatus for totally controlling each CE mobile computers 17 or 27 under a control program stored in the ROM 73. The real time clock circuit 72 may generate time information. The CPU 71 may detect a present time by reading the real time information from the real time clock circuit 72.

The RAM 74 may be a readable/writeable memory used by the CPU 71 when the CPU 71 processes data. The communication I/F 75 may execute data communication between outside machines (for example, a copier), and itself. The outside memory control unit 76 may execute interface control between the HDD 79 and itself. The display control unit 77 may execute interface control between the LCD display 80 and itself. Further, the keyboard I/F circuit 78 may execute interface control between the keyboard 80 and itself.

When a problem occurs in the copier 13, the printer 24 and so on, the copier, for example, may transmit information related to the problem to the central system 1 via the private I/F, such as wired I/Fs 16a, 16b, 25, and a wireless I/F 26, the communication adaptor 11 or 21, and the public communication network 5. The problem may indicate a situation that a prescribed time period has elapsed, or a prescribed number of sheets have been copied, after a previously executed repair, maintenance and adjusting operation for the image forming apparatus.

The central system 1 may include a problem information file 59e in the HDD of the server 3 for storing problem information. Thus, when receiving the information related to the problem from the user site, each client computer 2a, 2b, and so on may store the information in the problem information file 59e illustrated in FIG. 5, and display the information as illustrated in FIG. 6 on the CRT display 41.

Each client computer may also store an information receiving time, and an elapsed time period from the receiving time in the problem information file 59e, and also display this information on the CRT display 41. The elapsed time period may continuously be counted and is continuously displayed by the client computer, until the client computer receives information indicating completion of a repair and so on from the service person. The communication adaptors 11 and 21 may periodically execute polling to each of the image forming apparatus connected thereto, and the CE mobile computers 17 and 27, based on a prescribed device address code order.

Hereinbelow, an operation of the supervising system for image forming apparatus of the present invention is explained. To facilitate an explanation, since an operation of each mobile computer is almost the same, only a processing operation to be executed by the CE mobile computer 17 is explained. The CE mobile computer 17 may function as an operation information inputting device and an operation information informing device.

A prescribed CE in charge of dealing with a problem, which occurred in a prescribed image forming apparatus, may selectively click one of the buttons displaying the terms: ARRIVAL, OPERATION START and OPERATION END, each of which is displayed on the LCD display 80, corresponding to a particular situation using a keyboard 81 or a mouse thereof (not shown), of the CE mobile computer 17. The CE may further input a CE code allocated to him or her into the CE mobile computer 17. The CE code may function as a security of the supervising system for the image forming apparatus.

When the ARRIVAL button is clicked, information indicating arrival of the service person to a user having the problem in his or her image forming apparatus is input to the CE mobile computer 17. When the OPERATION START button is clicked, information indicating a start of an operation, such as a repair and a maintenance (e.g., checking and adjusting of the image forming apparatus), is input to the CE mobile computer 17. When the OPERATION COMPLETE button is clicked, information indicating completion of the operation is input to the CE mobile computer 17. Each information is included in operation information mentioned later.

Figure 7:
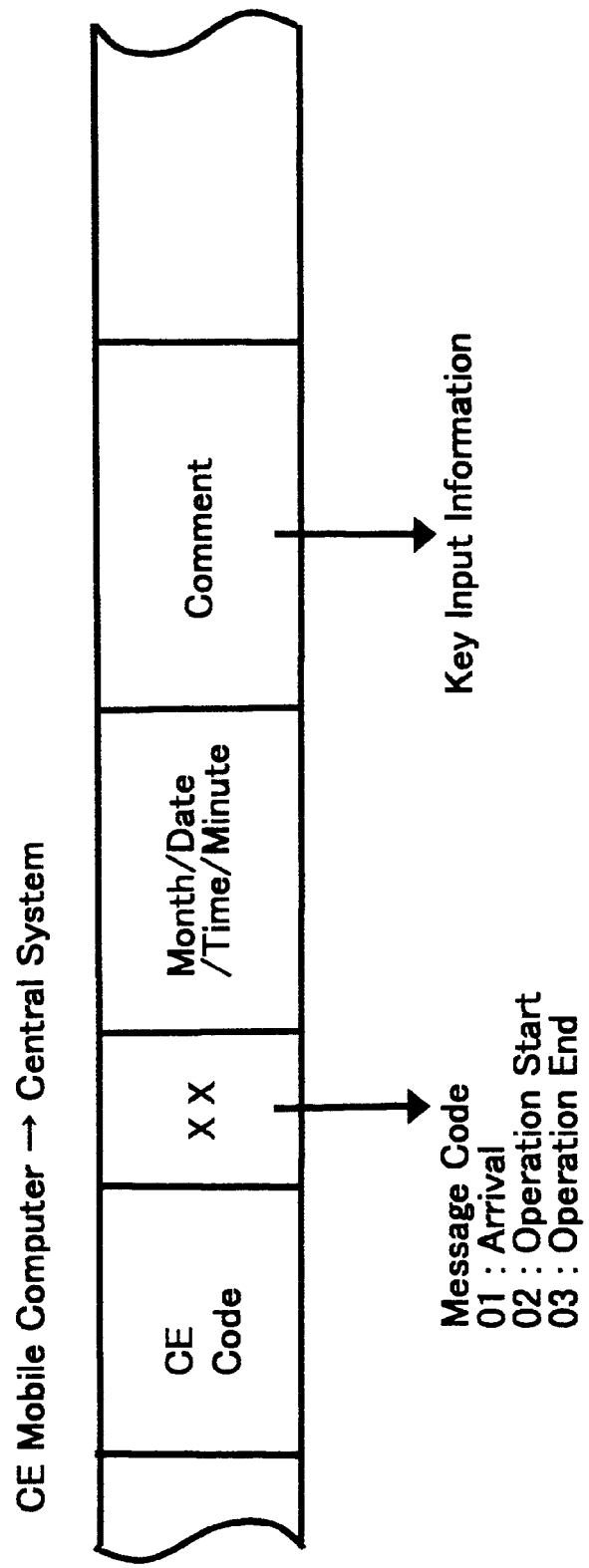
FIG. 7 is a chart that illustrates an example of a data format to be transmitted from the mobile computer to the central system illustrated in FIG. 1, when an operation status is reported by a service person from a user site.

As illustrated in FIG. 8, the CE mobile computer 17 may transmit informing data including the operation information and the CE code to the communication adaptor 11 via the copier 13 and the wired I/F 16b in a data format illustrated in FIG. 7. As illustrated in FIG. 7, a header generally required for data communication is omitted from the data format. A message code may include a prescribed code corresponding to the button selectively clicked by the CE. Data related to a month, date, time and minute can be generated by a calendar included in the CE mobile computer 17, and automatically included in the data format when corresponding data communication is executed to the communication adaptor 11.

The communication adaptor 11 may store communication data when data is received. The communication adaptor 11 may also execute an automatic call sequence, and transmit the communication data to the central system 1 via the public communication network 5, when it receives an acknowledge response (ACK) from the central system 1 via the public communication network 5.

A prescribed client computer may check if the CE code is valid, namely, if the CE code has been already registered, when receiving the communication data including the CE code and the operation information. If it is invalid, the central system 1 may transmit a message requesting urgent reconfirmation to the CE mobile computer 17 via the communication network 5, the communication adaptor 11, the wired I/F 16b and the copier 13.

If the CE code is regarded as valid, a prescribed code included in a CE status code field of the problem information file 59e illustrated in FIG. 6 is overwritten with a new CE status code so that the central control system 1 can perform control operations based on the new information. The code 01 of the CE status code field may represent arrival of the service person. The code 02 may represent a start of an operation of the service person. The code 00 may represent non-arrival of information from the service person.

When a prescribed time period has elapsed after the arrival of the service person at the user site, the CRT display 41 may change a manner in displaying an item indicating the problem, for example, by blinking the item. Thus, the blinking item may arouse an attention of a supervisor, such as the operator of the service center, so that the supervisor takes necessary action. When receiving information indicating the completion of an operation of the service person, the central system 1 may automatically erase corresponding information from the problem information file 59e and the corresponding item from the CRT display 41.

As mentioned above, upon the arrival of the service person to a setting place of the copier 13, a start of an operation and a completion of the operation of the service person can be informed to the central system 1 by inputting the corresponding CE status information by clicking the corresponding button of the CE mobile computer 17 and by transmitting the CE status information via the wired I/F 16b, the communication adaptor 11, and the public communication network 5.

Thus, even if the copier is used, communication between the CE at the user site A and the service center S can be quickly executed before and after his or her operation for the copier 13. Thus, an operation efficiency of the CE may be improved. Further, the central system 1 may grasp an action status of the CE by obtaining the CE status information from the CE mobile computer 17, and continuously provide quality service to the customer based on the CE status information.

Hereinbelow, another example of the invention is explained. In this example, the CE mobile computer 17 may function as a history information requesting device and a requested data informing device. Further, the central system 1 may function as a history information storing device and a history information transmitting device.

Before starting an operation for the copier 13, a CE in charge of the copier 13 may click a button indicating History INFORMATION REQUEST displayed on a LCD display 80 using the mouse or the keyboard 81 of the mobile computer 17. The CE then inputs a CE code allocated thereto, a corresponding model and machine number code, a condition of a term, for example, a prescribed past month, and a number of cases, for example, 10 cases caused prior to a present time to identify history information.

When the History INFORMATION REQUEST button is clicked, data indicating a request for history information related to an operation of the prescribed copier 13 is input to the CE mobile computer 17. If neither the term condition nor the number of cases is designated by the CE, one month or ten cases, respectively, can be used as default amounts.

Figure 9A:
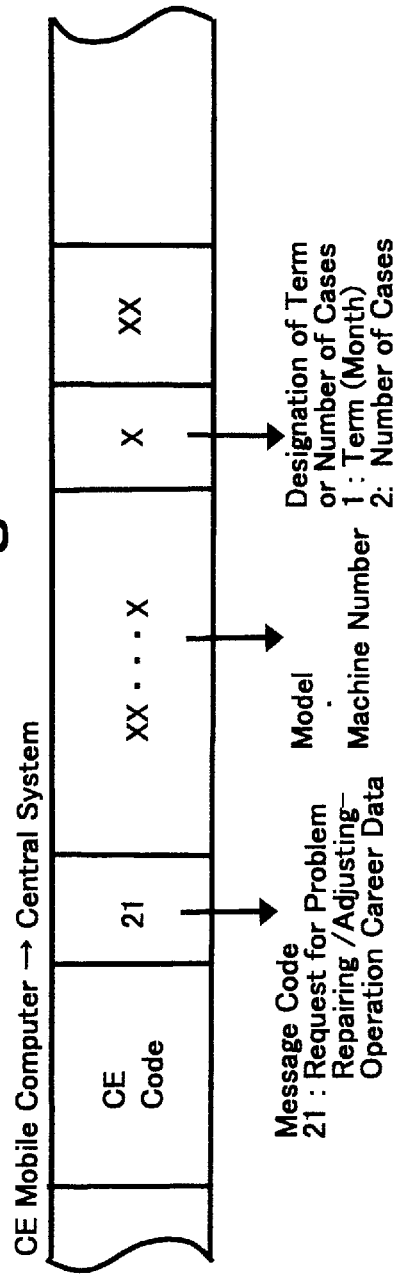
FIGS. 9A and 9B are charts illustrating an example of a data format transmitted from the mobile computer to the central system, when operation history information is requested by the service person.

The CE mobile computer 17 may transmit the request information including the CE code input and the identifying data in a format as illustrated in FIG. 9A to the communication adaptor 11 via the copier 13 and the wired I/F 16b as illustrated in FIG. 10. A prescribed header and a communication code and so on are omitted from the illustrated format, since those are conventional. A message code may include a prescribed code corresponding to a button clicked by the CE.

The communication adaptor 11 may store the request information when receiving the same, and execute a prescribed automatic call sequence to the central system 1 via the public communication network 5. The communication adaptor 11 may transmit the request information to the central system 1 when it receives an acknowledge response (ACK) from the central system 1 via the public communication network 5.

Figure 9B:
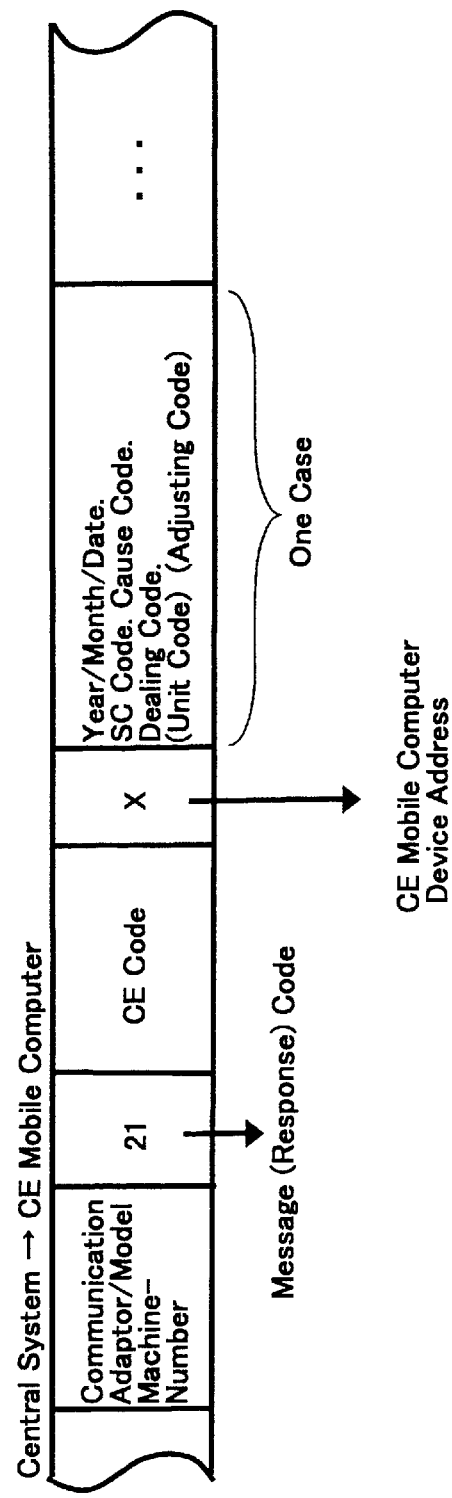

A prescribed client computer may check if the CE code is valid when receiving the request information. If the code is invalid, a message requesting urgent reconfirmation is transmitted to the CE mobile computer 17 via the public communication network 5, the communication adaptor 11, the wired I/F 16b, and the copier 13. If the CE code is valid, the prescribed client computer may retrieve history data to read from the problem and adjusting history file included in the history DB 59a stored in the HDD 59 of the server 3, corresponding to the codes of the model and the machine number, and the term condition and so on. The central system 1 may transmit corresponding history data to the CE mobile computer 17 in a prescribed data format illustrated in FIG. 9B via the public communication network 5, the communication adaptor 11, the wired I/F 16b, and the copier 13 as illustrate in FIG. 10.

The problem and adjusting history file may store the same information as the above-mentioned problem information file 59e stores as history information. However, the problem information is not erased from the problem and adjusting history file, even if information indicating completion of an operation for a prescribed image forming apparatus is received from the CE. The CE mobile computer 17 may store the history information when receiving the same from the central system 1, and display this on the LCD display 80. Thus, the service person can study the history information of the image forming apparatus having the problem, and easily repair, for example, using the history information.

As mentioned above, since history information related to an operation of a prescribed copier 13 can be obtained and displayed on the LCD display 80 when history information is requested from the central system 1 via the wired I/F 16b and so on by operating the button of the CE mobile computer 17, a bothersome preparation can be omitted before visiting the user. Further, wasted time can be avoided, and a prompt response can be made for the same reason.

Hereinbelow, still another example of the supervising system for image forming apparatus of the present invention is explained. In this example, the CE mobile computer 17 may function as maintenance related materials requesting device, a request information informing device, and maintenance related materials displaying device. Further, the central system 1 may function as a related materials information storing device and a related materials information transmitting device.

A CE in charge of a copier 13 may input a model name of the copier 13 into the CE mobile computer 17 using a mouse or a keyboard, by selecting a button indicating POSITION SELECTING displayed on the LCD display 80. The CE mobile computer 17 may display a table listing units of a model corresponding to the copier 13 as illustrated in FIG. 11.

If the table can not be fully displayed on the LCD display, it is divided into a plurality of blocks, and a next block of the table can be displayed by scrolling so that a prescribed object (desired portion) can be selected. Then, the CE may designate a prescribed unit code in the table on the LCD display 80 using the mouse or the keyboard of the CE mobile computer 17, and input a prescribed CE code allocated to the CE.

The unit code may represent a request for maintenance related materials, such as a service manual explaining a method of disassembling a prescribed unit of the copier 13 and a method of assembling the unit. As illustrated in FIG. 13, the CE mobile computer 17 may transmit request information including the CE code, the model name code, and the unit code to the communication adaptor 11 via the copier 13 and the wired I/F 16b in a data format illustrated in FIG. 12A.

A prescribed header and a communication control code and so on are omitted in the drawing, since those are not new. A message code may include a prescribed code corresponding to a designated button. An output destination device address may not be required to be input to the mobile computer 17, if an output destination of the maintenance related materials is the CE mobile computer 17 itself, and may be required, if it is the copier 13 as mentioned later.

The communication adaptor 11 may store the request information when having received the same, and execute a prescribed automatic call sequence to the central system 1 via the public communication network 5. The communication adaptor 11 may transmit the request information to the central system 1 via the public communication network 5 when it receives an acknowledge response (ACK) from the central system 1 via the public communication network 5.

A prescribed client computer may check if the CE code is valid when receiving the request information including the CE code, the model name and the unit code. If the CE code is invalid, the prescribed client computer may transmit a message requesting urgent reconfirmation to the CE mobile computer 17 via the public communication network 5 and so on.

If the CE code is valid, the prescribed client computer may retrieve prescribed maintenance related materials data from a maintenance manual DB 59*b* stored in the HDD 59 of the server 3, which includes drawings describing methods of disassembling and assembling the unit corresponding to the unit code and a table of a parts list as illustrated in FIG. 14.

Thus, the maintenance manual DB 59*b* may store data including drawings indicating a method for disassembling a prescribed unit of an image forming apparatus and a method for assembling parts of the disassembled portions, and a table listing parts of the image forming apparatus.

As illustrated in FIG. 13, the central system 1 may transmit the related materials data after reading it from the maintenance manual DB 59*b* to the CE mobile computer 17 via the public communication network 5, the communication adaptor 11, the wired I/F 16*b* and the copier 13. At this time, a device address of the CE mobile computer 17 is automatically included with the maintenance related materials data. The CE mobile computer 17 may store the maintenance related materials data in the HDD 79, and display the same on the LCD display 80 when such data is received. Thus, the CE can easily repair the copier 13 by, for example, disassembling and assembling the unit having the problem referring to the maintenance related materials.

As mentioned above, since the CE can receive the data of the above-mentioned drawings and the table from the central system 1, each of which is used for repairing, checking and adjusting of the unit having the problem, and display this information on the LCD display 80, the CE may be relieved from burdensome preparation generally required before visiting the user having the problem. Thus, a needless time can be omitted, and the CE can quickly respond to a request from the user.

Hereinafter, yet another example is explained. In this example, the CE mobile computer 17 may function as a related materials requesting device, a request information informing device, a maintenance related materials displaying device, a print designating device, and a designated data informing device. The central system 1 may function as maintenance related materials storing device, a maintenance related materials returning device, and related materials transmitting device.

When the maintenance related materials is complex and voluminous, it is not suitable to transmit the maintenance related materials from the central system 1 to the CE mobile computer 17. Thus, the operator may uniquely operate as described below. The CE in charge of the copier 13 may input the above-mentioned request information in a same manner as mentioned earlier using the keyboard 81 or the mouse of the CE mobile computer 17. The CE further inputs a device address allocated to the copier 13 or another image forming apparatus, for example, a printer 14 connected to the wired I/F 16*b*, to which the copier 13 is also connected, as an output destination device address.

Figure 12A:
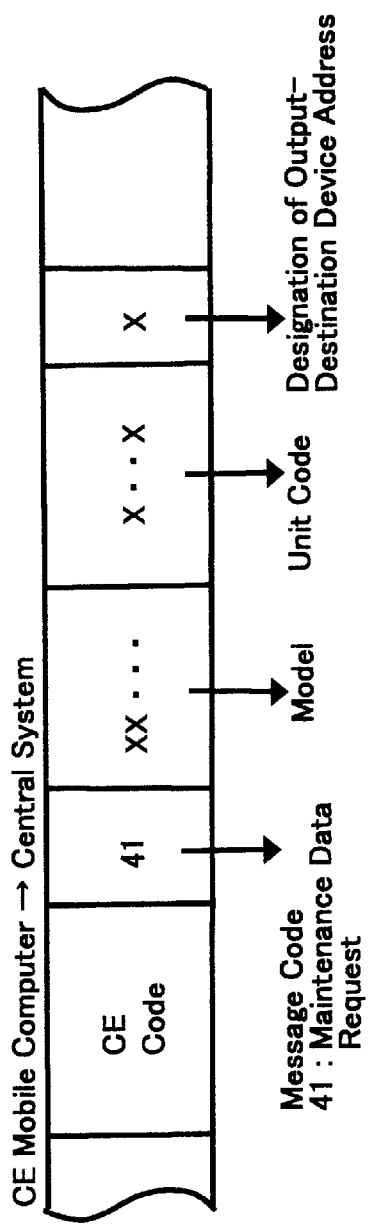
FIGS. 12A and 12B are charts illustrating an example of a data format to be transmitted between the mobile computer and the central system, when a prescribed image forming apparatus is selected as a recipient of the operation history information.
Figure 13:
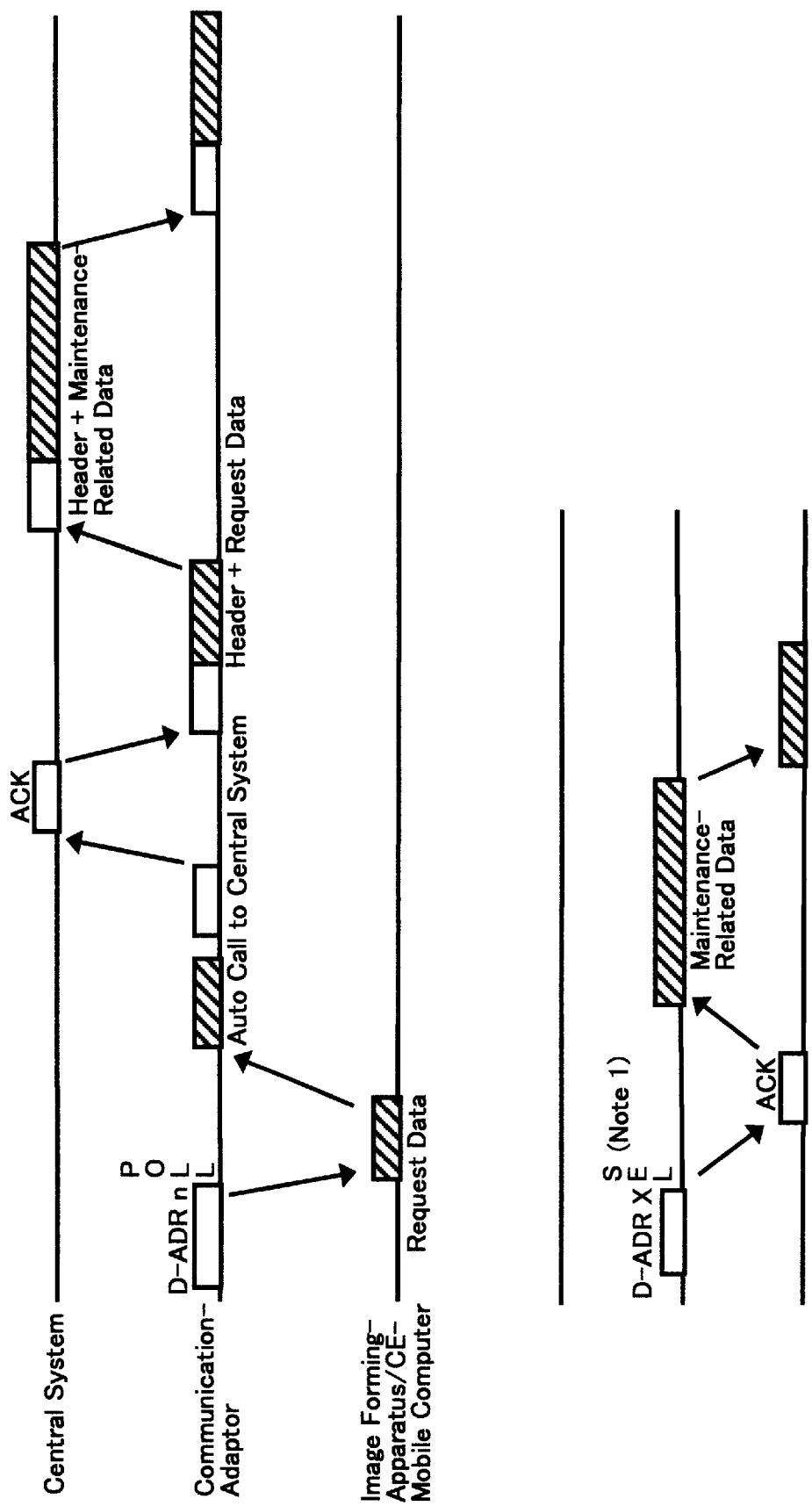
FIG. 13 is a chart that explains a sequence of data communication between the mobile computer and the central system, when the prescribed image forming apparatus is selected as the recipient of the operation history information.

As illustrated in FIG. 13, the CE mobile computer 17 may transmit request information including the CE code, the model name, the unit code, and the output destination device address in a data format illustrated in FIG. 12A to the communication adaptor 11, when it receives a polling operation from the communication adaptor 11.

The communication adaptor 11 may store the request information therein after receiving the same. The communication adaptor 11 may execute a prescribed automatic call sequence to the central system 1 via the public communication line 5, and transmit the request information to the central system 1 via the public communication line 5 when receiving an acknowledge response (ACK).

A prescribed client computer in the central system 1 may check if the CE code is valid when receiving the request information. If the CE code is invalid, the prescribed client computer may transmit a message requesting urgent reconfirmation to the CE mobile computer 17 via the public communication network 5, the communication adaptor 11, the wired I/F 16*b*, and the copier 13. If the CE code is valid, the prescribed client computer may retrieve maintenance related materials data from the maintenance manual DB 59*b*.

Figure 12B:
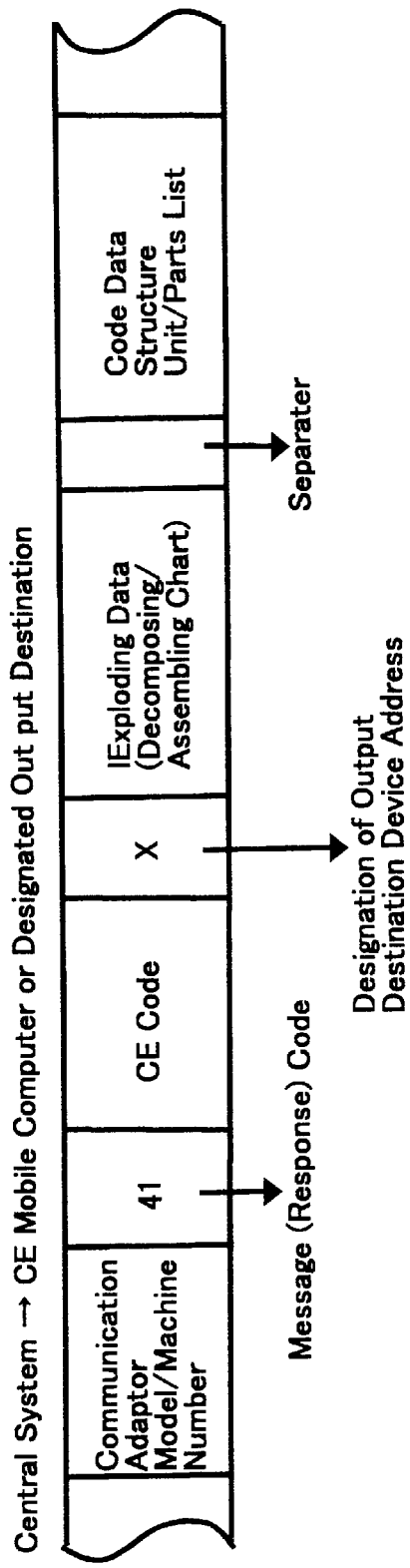

As illustrated in FIG. 13, the prescribed client computer may transmit the maintenance related materials data to the image forming apparatus designated by the output destination device address via the public communication network 5 and so on in a data format illustrated in FIG. 12. The maintenance related materials data may be printed out on a sheet by the image forming apparatus designated by the output destination device code.

Note 1 shown in FIG. 13 indicates D-ADR X, in which the letter X may represent a device address of a designated image forming apparatus. If the image forming apparatus designated by the output destination device address is operating, the communication adaptor 11 may periodically execute a selecting operation, and transmit the maintenance related materials data to the image forming apparatus when it detects that the image formation has stopped. Thus, the maintenance related materials data can be printed out by the image forming apparatus. The above-mentioned detection of the image formation is executed by polling the image forming apparatus, and a stop of an image formation is determined when a busy response is returned from the image forming apparatus.

The prescribed client computer can transmit a message indicating that a prescribed image forming apparatus has received the maintenance related materials data to the CE mobile computer 17, and have the CE mobile computer 17 display the message on the LCD display 80. Thus, the above-mentioned maintenance related materials can be requested from the CE mobile computer 17 to the central system 1 using the keyboard of the CE mobile computer 17, and the maintenance related materials can be printed out by an image forming apparatus designated by the CE.

Thus, even if the related material is complex and voluminous, a printed image can be easy to see and to handle. Further, since a prescribed client computer of the central system 1 may automatically respond and handle a request for the related materials, a burden of the central operator can be almost completely removed.

Hereinbelow, still another example of the supervising system for image forming apparatus of the present invention is explained. In this example, the CE mobile computer 17 may function as an operation result inputting device, and an operation result informing device.

To inform an operation result to a service center, a service person in charge of a prescribed copier 13 having a problem may input a CE code allocated to him or her, a corresponding model name, a machine number of the copier 13, and a result of the operation to his or her CE mobile computer 17 using a keyboard 81 or a mouse of the CE mobile computer 17 when the operation is completed for the copier 13. Namely, the CE may selectively input an SC (service person call) code, a problem cause code, a dealing code, a adjusting code indicating completion of either an adjusting operation or a checking operation, a unit code, and an adjusting amount, if capable of representing an adjusting amount by number, into the CE mobile computer 17 as operation result data.

The HDD 79 of the CE mobile computer 17 illustrated in FIG. 4 may store an SC code table illustrated in FIG. 15, a problem cause code table illustrated in FIG. 16, and a dealing code table illustrated in FIG. 17. The CE mobile computer 17 may display contents of one of the code tables selected by the CE on the LCD display 80.

When a prescribed portion of the code table displayed on the LCD display 80 is designated by the CE corresponding to the result of the operation, for example, by clicking the prescribed portion, the CE mobile computer 17 may input a code indicating the result of the operation corresponding to the designated portion. As illustrated in FIG. 19, the CE mobile computer 17 may transmit operation result data including the CE code, the model name, the machine number, and the operation result code in a data format illustrated in FIG. 18 to the communication adaptor 11 via the copier 13, and the wired I/F 16b.

Figure 18:
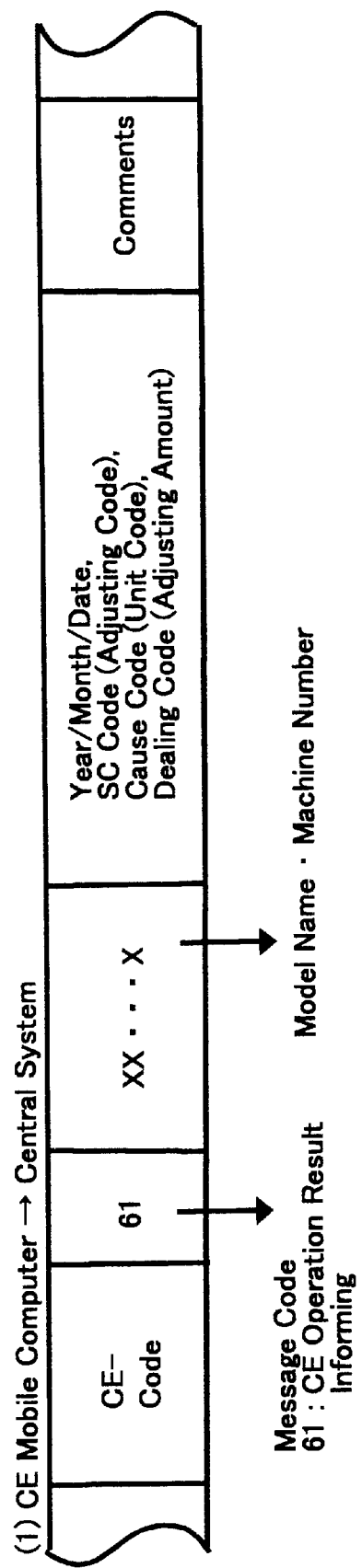
FIG. 18 is a chart that illustrates a data format transmitted from the mobile computer to the central system, when an operation result is reported by the service person to the central control system.

As understood from FIG. 18, a header portion required for data communication, a communication control code and so on are omitted therefrom, since those are not new. The message code may represent a prescribed code corresponding to a designated button. The year, month, and date can be generated by the calendar 17 installed in the CE mobile computer 17, and is automatically included in corresponding informing data when the data is transmitted to the communication adaptor 11. A comment field can be included in the data format when the CE clicks a button indicating OTHER INFORMATION (not shown).

The communication adaptor 11 may store the operation result data when receiving the same, and execute a prescribed automatic call sequence to the central system 1 via the public communication network 5. The communication adaptor 11 may transmit the operation result data to the central system 1 when it receives an acknowledge response (ACK) from the central system 1.

A prescribed one of client computer may check if the CE code is valid when receiving the above-mentioned operation result data. If it is invalid, the client computer may transmit a message requesting urgent reconfirmation to the CE mobile computer 17 via the public communication network 5 and so on.

If the CE code is valid, the client computer may display information corresponding to the operation result code included in the operation result data on the CRT display 41. The client computer then automatically erases an item included in the information from the CRT display 41 if a problem corresponding to the item has been repaired. Further, if the operation code indicates that the prescribed unit or parts of the copier 13 has been exchanged with a new one, the client computer may transfer a code indicating a request for a new unit or parts of the copier 13 to a unit/parts stock control system (not shown) so that the new unit or the new parts are ordered.

Thus, by informing the central system 1 of a result of the operation for the designated image forming apparatus 13 via the wired I/F 16b and so on using the keyboard of the CE mobile computer 17, the CE is relieved from making a report on a dealing result, an exchanged unit and parts as an operation result when returning to his or her office. Further, since the CE is not required to request an input of the operation result to the operator of the service center, burdens on the CE and the central operator are not so heavy. Further, since a particular computer for inputting the operation result is not required, an equipment cost can be suppressed, and equipment can be efficiently used.

Hereinbelow, still another example of the supervising system for image forming apparatus of the present invention is explained. In this example, the CE mobile computer 17 may function as an action schedule inquiring device, and an inquiring request information informing device. The central system 1 may function as an action schedule information transmitting device.

When a CE in charge of a copier 13 having a problem has completed a prescribed operation for the copier 13, the CE may select a button displaying NEXT ACTION INFORMATION REQUEST (not shown) using a mouse or a keyboard 81 of the CE mobile computer 17, and input a CE code allocated to him or her. Then, the CE may input inquiring data indicating an inquiry of a schedule to visit a next user to the CE mobile computer 17.

Figure 20A:
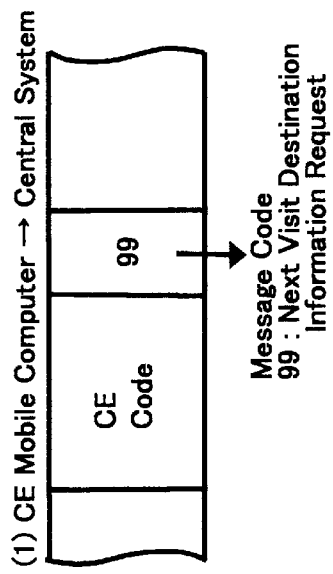
FIGS. 20A and 20B are charts illustrating data formats transmitted between the mobile computer and the central system, when a service person makes an inquiry of a next action schedule to the central control system.
Figure 20B:
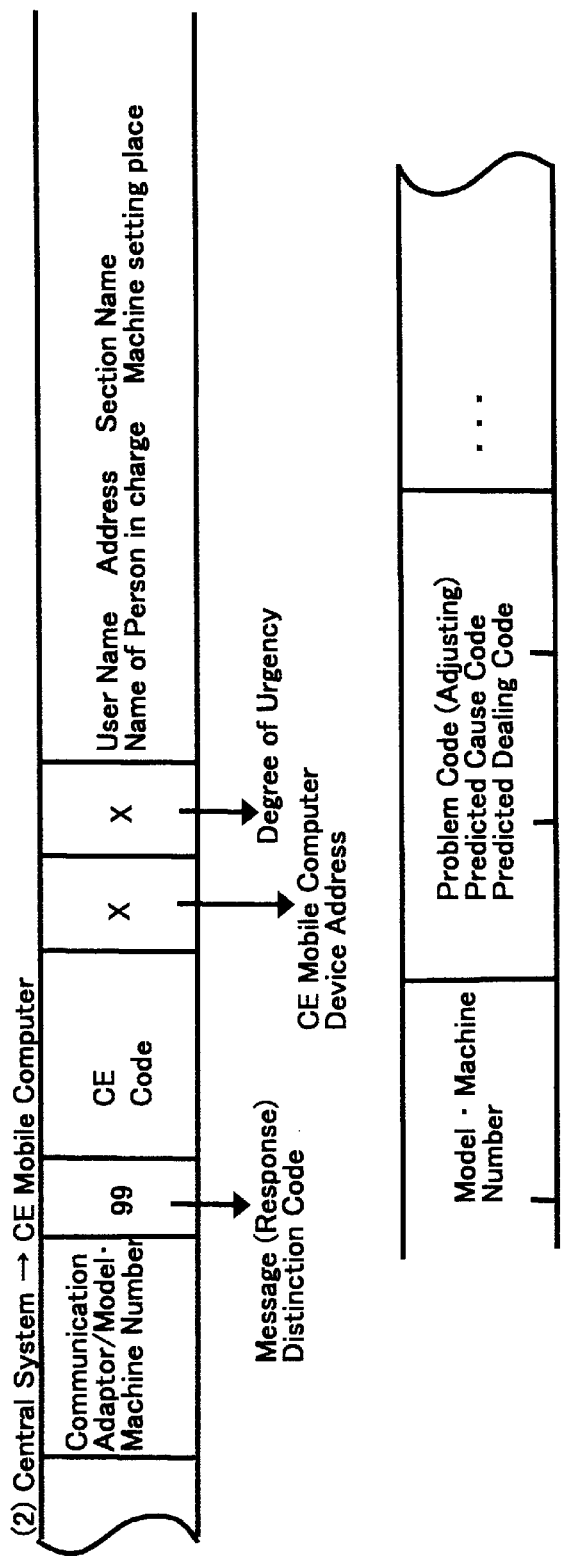

The CE mobile computer 17 may transmit request information including the CE data and the inquiring information to a communication adaptor 11 in a data format illustrated in FIG. 20A via the copier 13 and a wired I/F 16b when receiving a polling operation from the communication adaptor 11 as illustrated in FIG. 21. As understood from FIG. 20, a header required for data communication, a communication control code and so on are omitted. A message code is predetermined to correspond to a display button designated by the CE. The communication adaptor 11 may store the request information when receiving thereof. The communication adaptor 11 may execute a prescribed automatic call sequence to the central system via the public communication network 5, and transmit the request information thereto when receiving an acknowledge response (ACK) from the central system 1.

A prescribed client computer may check if the CE code is valid when receiving the request information. If the CE code is invalid, the client computer may transmit a message requesting that the CE code is urgently reconfirmed to the CE mobile computer 17 via the public communication network 5, the communication adaptor 11, the wired I/F 16b and the copier 13.

If the CE code is valid, the client computer may retrieve a next action instruction related data indicating a next action schedule to visit a next user from the CE schedule DB 59d stored in the HDD 59 of the server 3 to read the data corresponding to the inquiring data received.

The action schedule may include information of an urgent level, a name of a user, an address, a section name, a window of the user, a telephone number, and a copier setting position. The action schedule may further include information of a model name, a machine number, a problem code, an adjusting code, and a problem unit code. The CE schedule DB 59d may also store some next action instruction related data for each CE. The client computer may transmit the next action instruction related data in a data format illustrated in FIG. 20B to the CE mobile computer 17 via the public communication network 5, the communication adaptor 11, the wired I/F 16b, and the copier 13 as illustrated in FIG. 21. The CE mobile computer 17 may store the next action instruction related data in the HDD 79, and display the contents thereof on the LCD display 80. The CE may determine the next user to visit by using the data in a prescribed manner.

If the CE schedule DB 59b does not store the corresponding next action instruction related data, the prescribed client computer may transmit either data indicating a CE's company name instead of a name of a user to visit and having spaces in the following fields in a data format, or a message indicating that the CE is required to urgently return to his or her company.

Further, depending on a request from the CE, the prescribed client computer may transmit guidance information showing a route to a next user or a map or the like to the CE mobile computer 17 or another image forming apparatus connected to the same wired I/F with the copier 13 via the above-mentioned devices. The copier or the other image forming apparatus may print out the guidance and the map or the like.

Thus, since the CE can inquire a next user visiting schedule to the central system 1 after completing an operation for a copier 13 using the keyboard or the like, obtain the same from the central system 1, and display contents of the same on the LCD display 80, the CE is not required to make a telephone call to the service center S. Thus, a reconfirmation of the next action schedule is not required by returning to the office. Further, the CE can easily move to the next user.

The CE mobile computer 17 can be connected to the wired I/F 16b not via the copier 13 as mentioned above, but connected thereto via a facsimile 12, a printer 14, and a duplicator 15. Further, the CE mobile computer 17 can be directly connected to the wired I/F 16a. In any way, the same operation as mentioned earlier is executed.

Further, the CE mobile computer 27 can be connected to the wireless I/F 26 not via the printer 24, but connected thereto via the copier 23, and the facsimile 22. Further, the CE mobile computer 27 can be directly connected to the wireless I/F 26. In any way, the same operation as mentioned earlier can be executed. Thus, each image forming apparatus is not required to include a particular device for informing the service center S of prescribed information before and after the operation of the CE for the image forming apparatus is executed.

Figure 22:
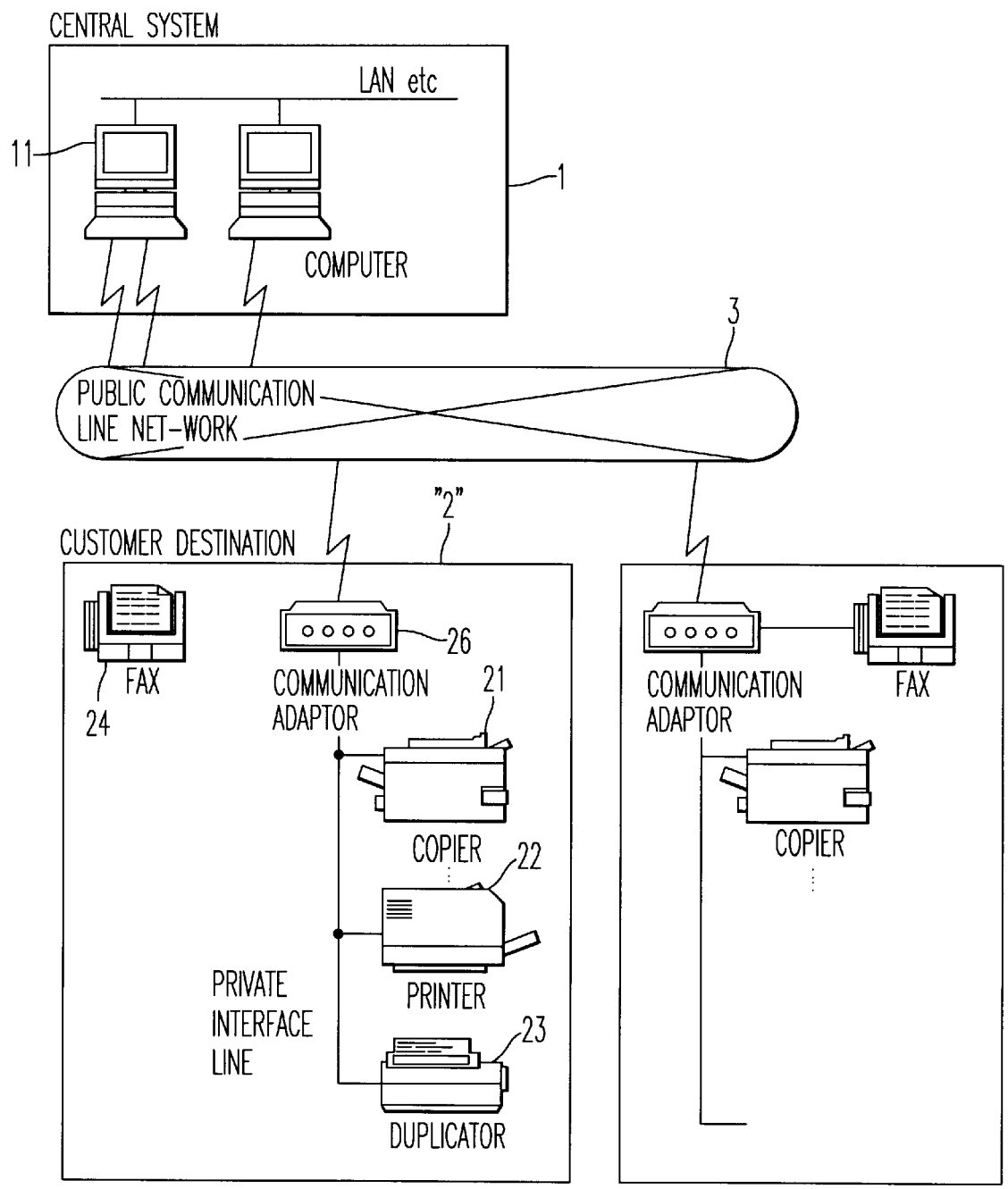
FIG. 22 is a chart that illustrates of an example of a structure of another supervising system for image forming apparatus of the present invention.

Hereinbelow, another embodiment of the present invention is explained referring to FIGS. 22 through 31. FIG. 22 illustrates another example of the supervising system for image forming apparatus for supervising a plurality of office machines from a remote site. The image forming apparatus supervising system may include a central system 11, a plurality of office machines 2, and a public communication network 3. The central system 1 may include a prescribed number of computers 11.

Each office machine (hereinafter referred to as a OA machine) 2 may include a plurality of image forming apparatus such as a copier 21, a printer 22, a duplicator 23, a facsimile 24 and so on. Each image forming apparatus may be connected to a communication adaptor 26 with a wired or a wireless private interface line 25. The communication adaptor 26 may be connected to the public communication network 3.

Figure 23:
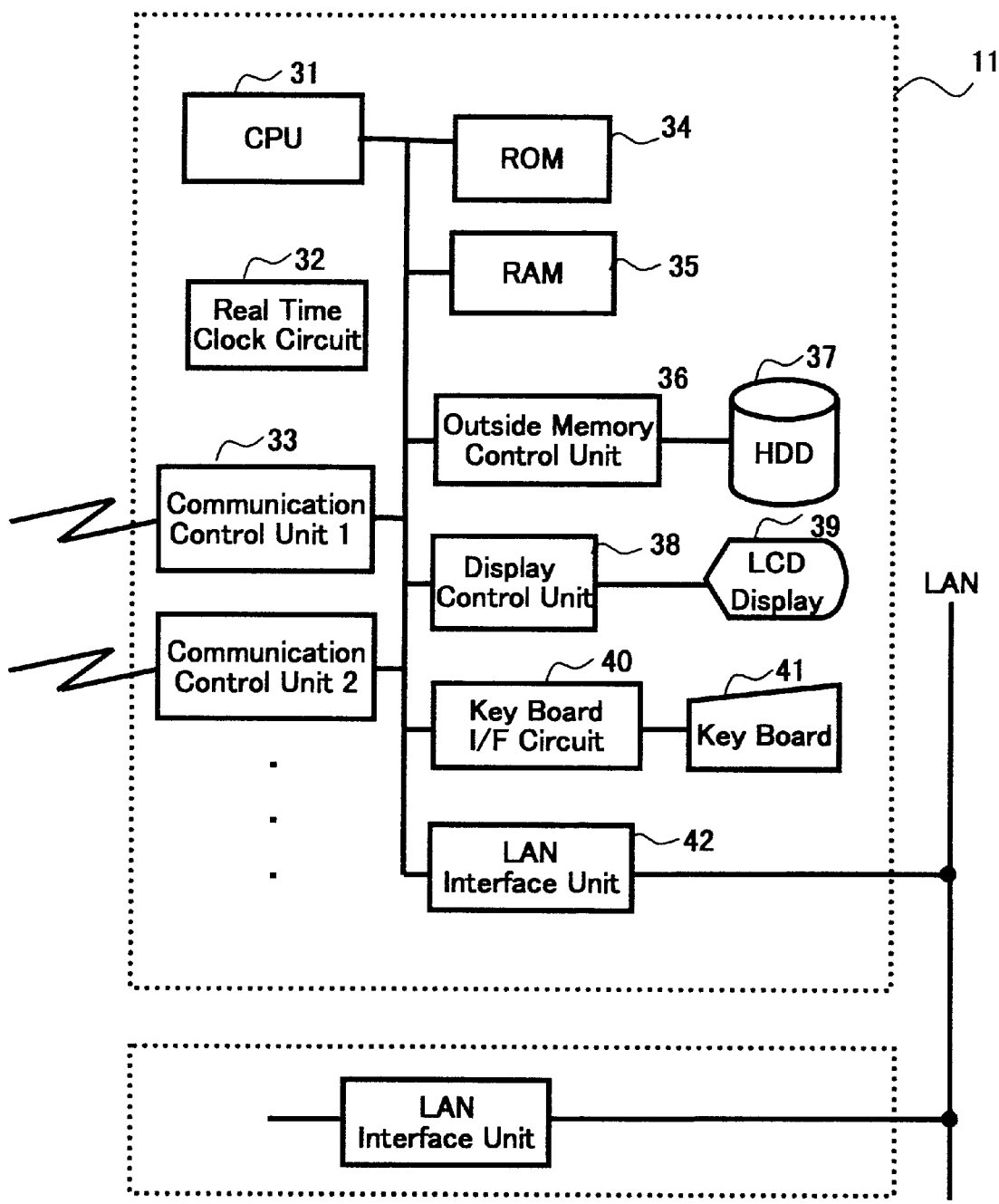
FIG. 23 is a block chart that illustrates a function of a computer of a central system included in the other supervising system illustrated in FIG. 22.

FIG. 23 is a block diagram explaining functions of the computer 11 of the central system 1. The computer 11 may include a central processing unit (hereinafter referred to as a CPU) 31, a realtime clock 32, a communication control unit 33, a read only memory (hereinafter referred to as a ROM) 34, a random access memory (hereinafter referred to as a RAM) 35, and an outside memory control unit 36. The computer 11 may further include a hard disk drive (hereinafter referred to as a HDD) 37, a display control unit 38, a cathode ray tube (hereinafter referred to as a CRT) display 39, a keyboard interface circuit 40, a keyboard 41, and a local area network (hereinafter referred to as a LAN) interface 42.

Figure 24:
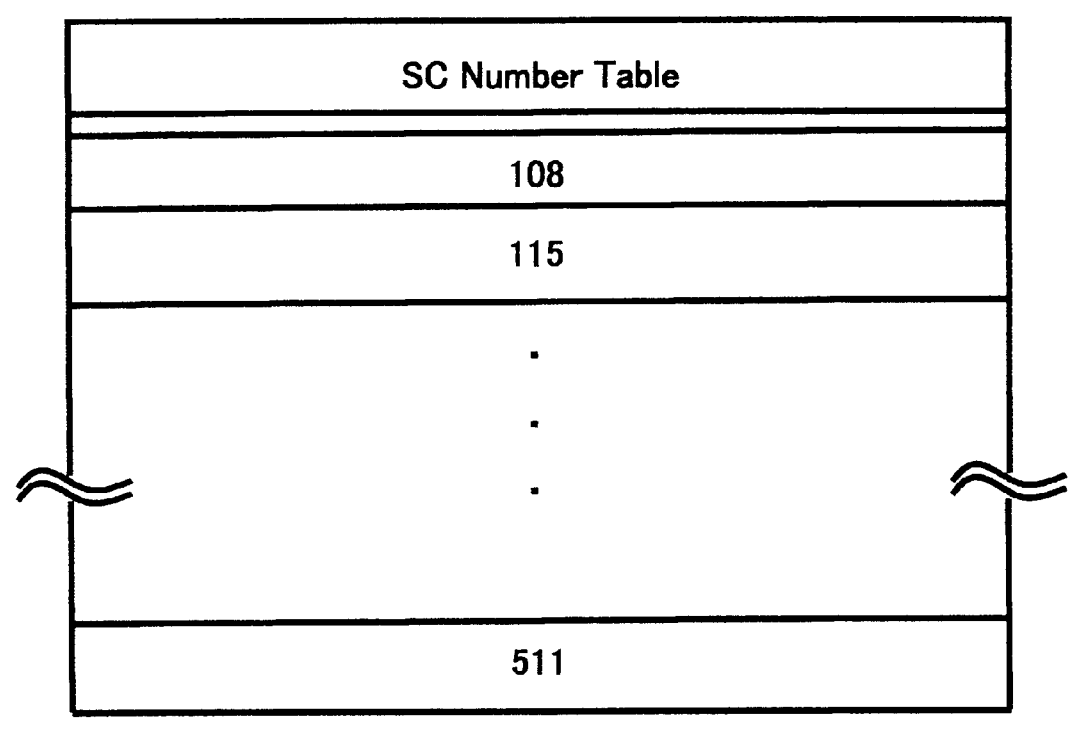
Figure 25A:
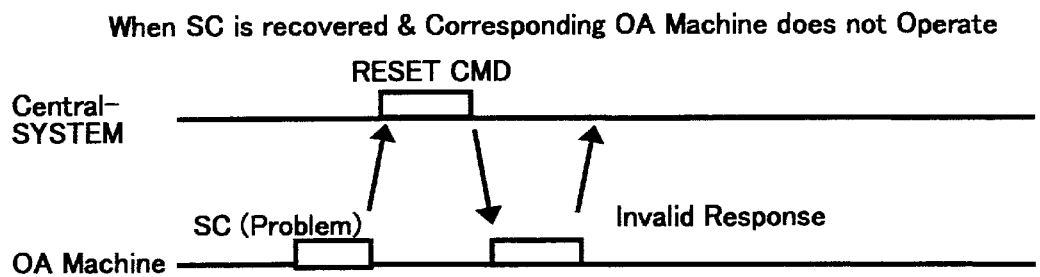
FIGS. 25A, 25B and 25C are charts illustrating one example of a sequence of data communication between an office machine of a user and the central system, when a reset instruction is transmitted from the central control system.
Figure 25B:
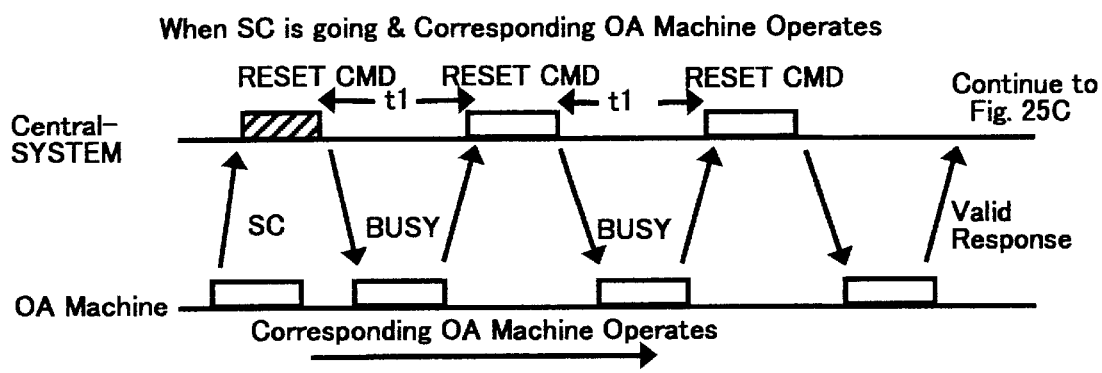
Figure 25C:
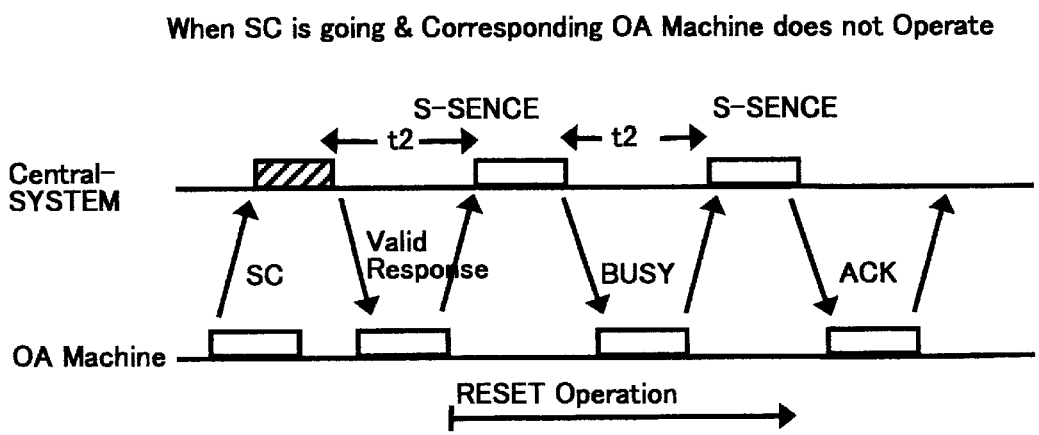
Figure 26:
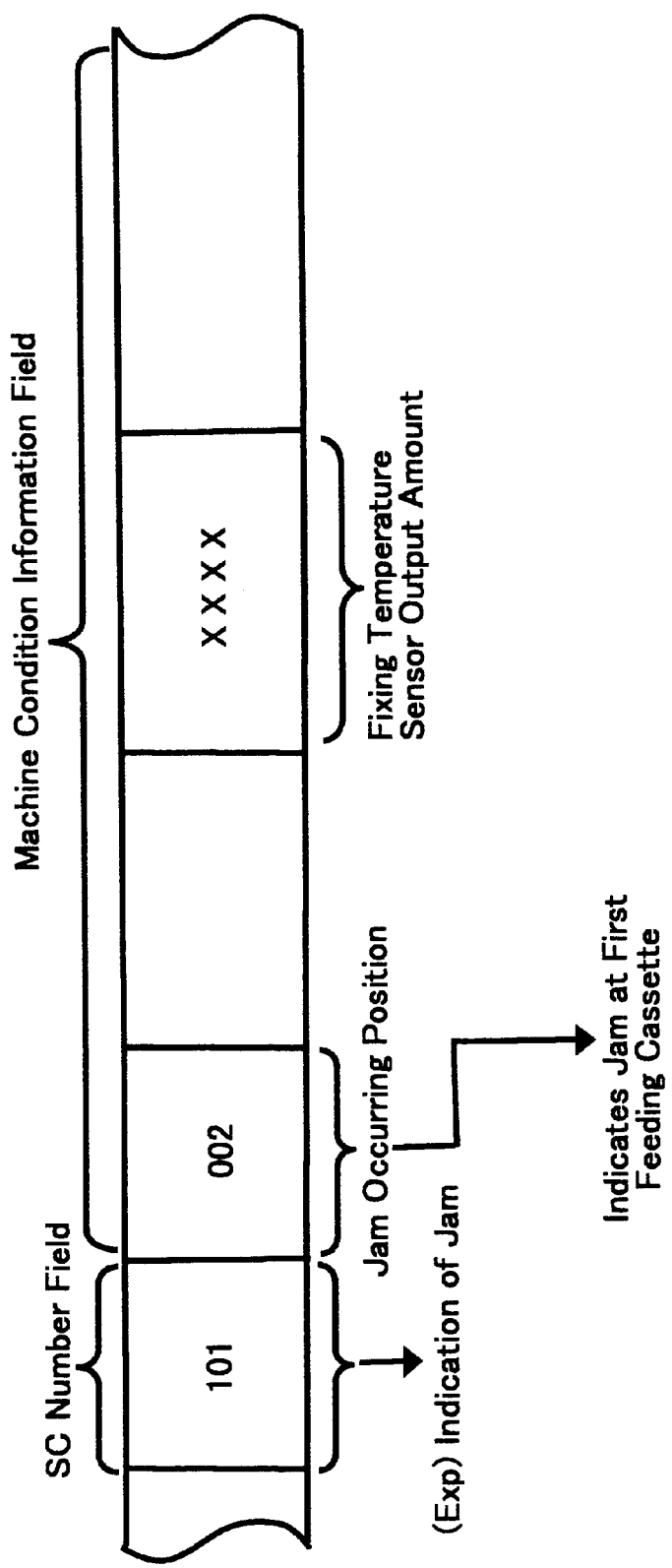
FIG. 26 is a chart that illustrates one example of a data format of problem information to be transmitted from the office machine to the central control system.

FIG. 24 illustrates a construction of a problem number table. FIGS. 25A, 25B and 25C illustrate data communication between the central system 1 and a user site when a prescribed problem occurs. FIG. 26 illustrates one example of a problem informing format to be sent from an OA machine to the central system 1.

The problem number table may be stored in the HDD 37 beforehand through the outside memory control unit 36. The problem informing format may be stored in the RAM 35 through the public communication network 3 and the communication control unit 33 when transferred from an OA machine.

The CPU 31 may continuously compare a service person call (hereinafter referred to as an SC) number of an SC field in the problem informing format with the SC number table illustrated in FIG. 24. If a corresponding number is included in the SC number table, the CPU 31 may determine that an automatic reset operation for an OA machine is possible from a remote site, and transmit a reset instruction to the corresponding OA machine having a problem via the communication control unit 33 and the public communication network 3. If a corresponding number is not included, the CPU 31 may determine that an automatic reset is not possible for an OA machine having a problem, and may not transmit a reset instruction thereto.

Hereinafter a general reset operation for an OA machine executed by the central system 1, when a problem occurs in the OA machine, is explained referring to FIGS. 25A–C, 26 and 27. When a problem occurs in one or more OA machines, and thereby an SC is generated, the OA machine may transmit the SC to the central system 1 (HDD 37) via the communication adaptor 26 and the public communication network 3 by automatically calling the central system 1. The problem may include an occurrence of a jam, an abnormality of a heater, an abnormality of a ramp, a mechanical abnormality of an optical system, and an abnormality of high voltage devices of the OA machine. This problem information can be transmitted in an information format illustrated in FIG. 26, and the central system 1 may recognize contents of the problem and a status of the OA machine.

Figure 27:
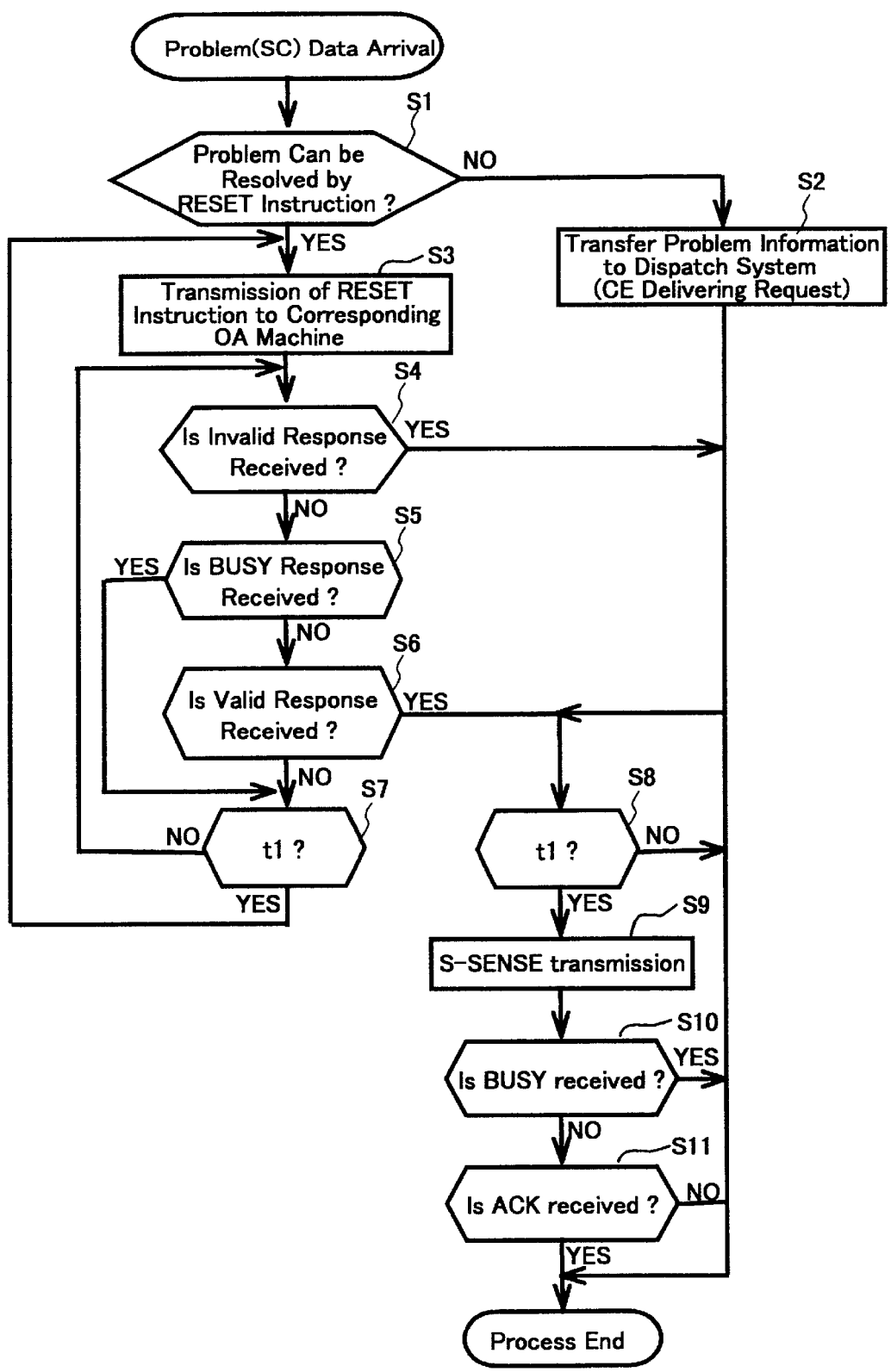
FIG. 27 is a flowchart that illustrates one example of data communication between the office machine and the central system.

The central system 1 may recognize an SC number included in the problem information format when receiving the same, and determine if a problem indicated by the SC number can be automatically solved by resetting the OA machine in step S-1 (see FIG. 27). If it is negative (i.e., NO), the central system 1 may order a service person to visit a user using the OA machine. If a dispatch system (not shown) for dispatching a service person to a user having a problem with an OA machine is established, such a dispatch order can be made in step S-2, and the central system 1 may be linked therewith to automatically transmit the information format illustrated in FIG. 26.

If the determination is positive (i.e., YES), for example, in a case of occurrence of alarm of a so called P sensor or the like, the central system 1 may transmit a reset instruction to the corresponding OA machine in step S-3 so that a prescribed voltage can be reset for the P sensor.

If the problem has already been solved by a user, for example, by turning an electrical power supply ON and OFF, as illustrated in FIG. 25A the corresponding OA machine may return an invalid response to the central system 1 in step S-4, since the reset operation is not required.

If the problem still remains in the corresponding OA machine and an image formation is executed as illustrated in FIG. 25B, the corresponding OA machine may transmit a busy response when receiving a reset instruction in step S-5. The central system 1 may retransmit the reset instruction thereto after a prescribed time period (t1) has elapsed in step S-7 when receiving the busy response. The corresponding OA machine may return a valid response to the central system 1 when receiving a reset instruction from the central system 1 after completion of its image formation in step S-6.

If the problem still remains in the corresponding OA machine and the image formation is not executed therein as illustrated in FIG. 25C, the OA machine may return a valid response when receiving the reset instruction in step S-6, and execute the reset operation under the reset instruction. The central system 1 may transmit a status sensing signal (hereinafter referred to as an S-sense signal) a prescribed time period (t2) after receiving the valid response in steps S-8 and S-9. If the corresponding OA machine is still executing the reset operation (step S-10), the corresponding OA machine may return a busy response. If the reset operation is completed, the corresponding OA machine may return an acknowledge response (ACK) in step S-11.

Hereinbelow, one example of the present invention is explained in detail.

FIG. 28 illustrates one example of a structure of a problem information file to be stored in the HDD 37 of the computer 11 of the central system 1. The problem information file indicates problems which occurred in OA machines. FIG. 29 illustrates one example of an overall display to be displayed on a displaying device of a prescribed computer 11 of the central system 1, which represents contents of the problem information file. A user ID, a model code, a call classification, a present status and so on illustrated in FIG. 28 may be coded corresponding to the contents of the overall display as illustrated in FIG. 30.

First, as illustrated in FIG. 25C, the central system 1 may erase one or more corresponding display portions, which is displayed on the display beforehand as illustrated in FIG. 29, and some corresponding problem information stored in the problem information file illustrated in FIG. 28 without condition, when receiving an acknowledge response from the corresponding OA machine after transmitting a reset instruction thereto, because the OA machine having informed the central system 1 of the SC is automatically successfully reset by the reset instruction.

Second, the central system 1 may automatically erase some corresponding problem information from the problem information file, only if a erasing flag is set at a state "1" when receiving a acknowledge response (ACK) from a corresponding OA machine after transmitting the reset instruction thereto. If the erasing flag is set at a state "0", the problem information is not erased unless a report on the problem to the user from the operator is made, for example. The erasing flag may be set at the state "1" when a prescribed user, model, and call classification, and these combinations transmit data. The central system 1 may compare a problem number included in the information format with the prescribed user, model and so on when receiving the problem information (SC). The central system 1 may write "1" in a prescribed corresponding field of the problem information file, if the problem number accords with the prescribed one of the user, model and so on, and write "0" therein if the problem number does not accord therewith. Thus, an automatic reset operation is executed depending upon the user, model, the call classification, and so on.

Third, the contents of the problem information file are written in a problem history information file illustrated in FIG. 30, and corresponding problem information in the problem information file and on the displaying device may be automatically erased when a reset operation for a corresponding OA machine is completed. The problem history information file may be useful, because condition report information related to a number of times problems occurred in the OA machine or the like may be transmitted to the corresponding user, and maintenance history data may be referred by the service person when repairing at a user site, after statistically analyzing the problem data stored in the problem information file.

An operator of the central system 1 may input a dealing code, a portion code, a parts code, and an operation result code to the problem information file, when receiving problem information from the service person via a telephone, a facsimile, and so on from the user site. For example, a dealing code "002" may represent a remote recovery using a reset instruction. An operation result code "2-0" may represent a successful recovery using a remote operation. A dealing code "009" may represent an exchange of parts of a corresponding OA machine. A position code XYZ may represent a position of exchanged parts. A parts code may represent parts exchanged. An operation result code "1-0" may represent that a recovery is successfully executed by the service person.

A fourth example is explained below. If a prescribed statistical data treatment is applied to the problem information file illustrated in FIG. 30, for example, a prescribed model having experienced a problem more than five times in March 1998 is retrieved, an OA machine having a model number XXXXX1000 is obtained, for example. Thus, the central system 1 can find a prescribed OA machine, which has the designated problem, and accordingly require maintenance by the service person. Further, it is useful for delivering the service person and solving the problem. The above-mentioned statistical data treatment can be automatically periodically executed by a prescribed software (not shown), for example, once a week.

Figure 31:
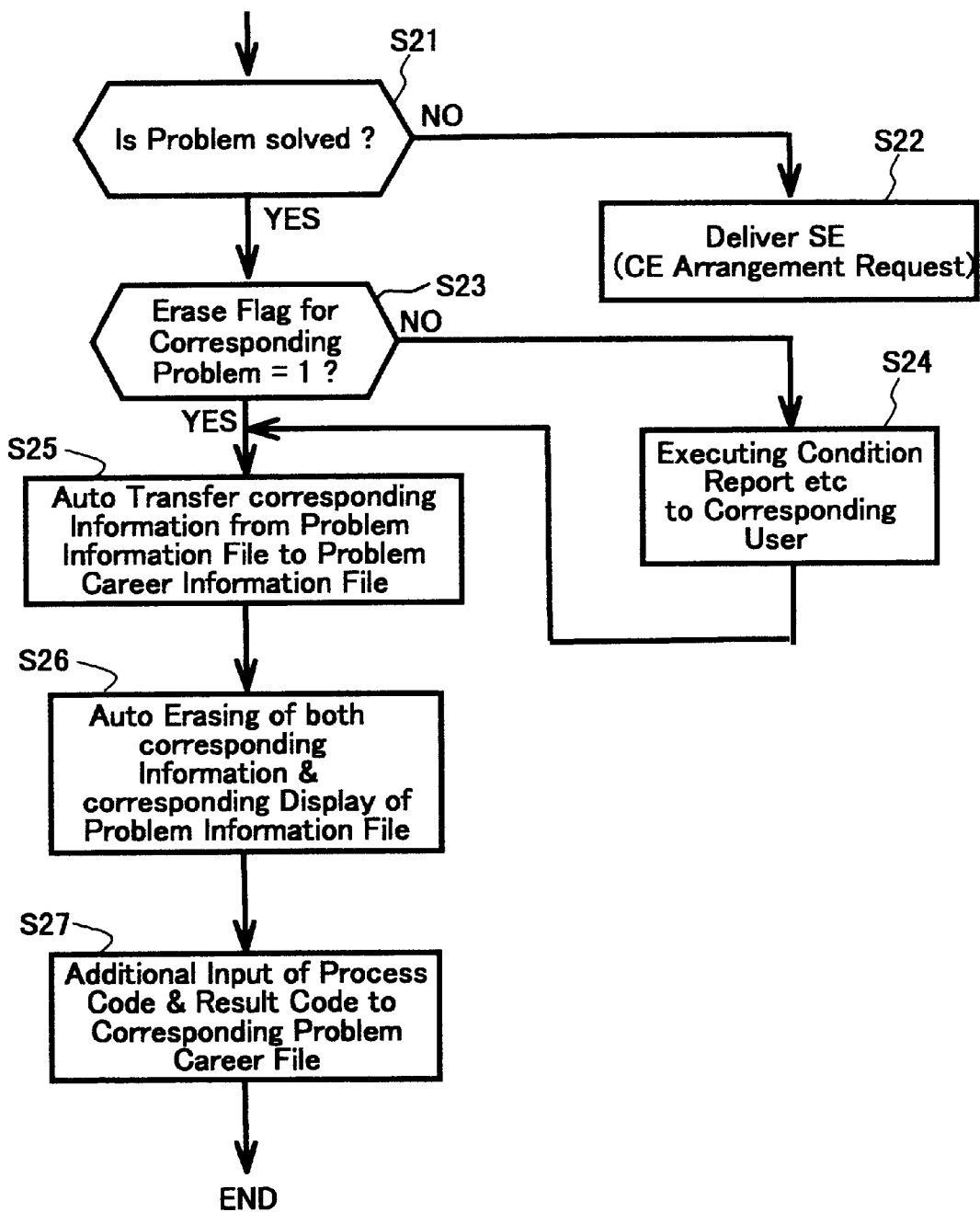
FIG. 31 is a flowchart that illustrates examples of both an erasing operation of the problem information displayed on the display of the central system, and storing the problem information in the problem history file before erasing thereof.

FIG. 31 illustrates an automatic erasing process for erasing problem information stored in the central system 1. If a problem is not solved by the prescribed reset instruction in step S-21, a service person is delivered in step S-22. If the problem has been solved by the prescribed reset instruction in step S-21, it is determined if an erasing flag is set at a state "1" in step S-23. If the flag is not at the state "1" in step S-23, a prescribed status report may be made to a corresponding user for reporting the status of the OA machine in step S-24.

If the flag is set at the state "1" in the step S-23, corresponding information of the problem file is automatically transferred to the problem information history file in step S-25, and the corresponding information of the problem information file and a corresponding display portion on the displaying device are automatically erased in step S-26. A dealing code and an operation result code may be additionally input, for example, by the operator to the corresponding problem information history file in step S-27.

The present invention also relates to a method of supervising a plurality of image forming apparatus connected to a central control apparatus via a public communication network, including the steps of selectively connecting, either directly or indirectly, a mobile computer to a communication adaptor connected to the public communication network for executing communications of information between the central control apparatus and the mobile computer. The central control apparatus may be located at a service center. The method also includes the steps of dispatching a service person to a user of a selected one of the plurality of image forming apparatus, inputting operation status information related to an operation status of the service person into the mobile computer, and informing the operation status information to the central control apparatus.

Also included is a method of supervising a plurality of image forming apparatus connected to a central control apparatus, which includes a display and a problem information storing device, via a public communication network, including the steps of informing the central control apparatus when a problem has occurred in a respective image forming apparatus by automatically calling the central control apparatus, determining if the respective image forming apparatus having the problem can be automatically reset when receiving the informed problem from the respective image forming apparatus, transmitting a reset instruction from the central control apparatus to the respective image forming apparatus if the determination of the determining step is positive, resetting the respective image forming apparatus when receiving the reset instruction from the central control apparatus, determining if a reset operation is completed by the respective image forming apparatus having the problem, and automatically erasing respective problem information stored in the problem information storing device, if the determination of the reset determining step is positive.

Numerous additional modifications and variations of the present invention are possible in light of the above teachings. It is therefore to be understood that within the scope of the appended claims, the present invention may be practiced other that as specifically described herein.

This application is based upon the Japanese patent applications Nos. 10-177666 filed on Jun. 24, 1998, and 10-155253 filed on May 20, 1998, the entire contents of which are hereby incorporated by reference.

What is claimed is:

1. A supervising system, comprising:
   a central control apparatus;
   a public communication network connected to said central control apparatus;
   a communication adaptor connected to said public communication network;
   a plurality of image forming apparatus connected to said communication adaptor via one of a wired interface and a wireless interface; and
   a mobile computer selectively connected to said one of the wired interface and the wireless interface, and configured to execute communications of information between the central control apparatus and itself via the public communication network,
   wherein said mobile computer includes:
      an operation history information inputting device configured to input operation history request information; and
      an operation history information informing device configured to inform the operation history request information to the central control apparatus, and
   wherein said central control apparatus includes:
      an operation history information storing device configured to store operation history information related to an operation executed by the service person for each of said plurality of image forming apparatus when receiving the operation history information from said each of the plurality of image forming apparatus;
      a reading device configured to read prescribed operation history information from said operation history information storing device when receiving a request for the operation history information from said mobile computer; and
      an operation history information transmitting device configured to transmit the operation history request information to said mobile computer.

2. The supervising system as claimed in claim 1, wherein said central control apparatus is located at a service center.

3. The supervising system as claimed in claim 1, further comprising a dispatch system configured to dispatch a service person to a user of a respective one of the plurality of image forming apparatus, and which is linked with the central control apparatus.

4. The supervising system as claimed in claim 1, wherein said mobile computer includes:
   an operation status information inputting device configured to input operation status information related to an operation status of the service person; and
   an operation status information informing device configured to inform the operation status information to the central control apparatus.

5. The supervising system as claimed in claim 4, wherein said operation status information includes a security code configured to identify the mobile computer.

6. The supervising system as claimed in claim 1, wherein said mobile computer includes:
   a service manual information request inputting device configured to input service manual request information; and
   a service manual information informing device configured to inform the service manual request information to the central control apparatus.

7. The supervising system as claimed in claim 6, wherein said central control apparatus includes:
   a service manual information storing device configured to store service manual information for each of the plurality of image forming apparatus;
   a reading device configured to read prescribed service manual information from said service manual information storing device when receiving a request for the prescribed service manual information from said mobile computer; and
   a service manual information transmitting device configured to transmit the prescribed service manual information to said mobile computer.

8. The supervising system as claimed in claim 7, wherein said mobile computer includes:
   an image forming apparatus designating device configured to designate a prescribed image forming apparatus, which is to receive and print said service manual information from said central control apparatus, and said central control apparatus transmits said service manual information to said prescribed image forming apparatus.

9. The supervising system as claimed in claim 1, wherein said mobile computer includes:
   an operation result information inputting device configured to input operation result information; and an operation result information informing device configured to inform the central control apparatus of the operation result information.

10. The supervising system as claimed in claim 1, wherein said mobile computer includes:
a next user inquiry request information inputting device configured to input next user inquiry request information related to an inquiry of a next user to visit; and
a next user inquiry request information informing device configured to inform said central control apparatus of the next user inquiry request information.

11. The supervising system as claimed in claim 10, wherein said central control apparatus includes:
an action schedule information storing device configured to store information related to an action schedule of each service person;
an action schedule information reading device configured to read prescribed action schedule information from the action schedule information storing device when receiving the next user inquiry request information from the mobile computer; and
an action schedule information transmitting device configured to transmit the prescribed action schedule information corresponding to the next user inquiry request information to the mobile computer.

12. A method of supervising a plurality of image forming apparatus connected to a central control apparatus via a public communication network, comprising the steps of:
selectively connecting, either directly or indirectly, a mobile computer to a communication adaptor connected to the public communication network for executing communications of information between the central control apparatus and the mobile computer;
inputting operation history request information of a respective one of the plurality of image forming apparatus into the mobile computer;
informing the operation history request information to the central control apparatus;
storing in the central control apparatus operation information related to an operation executed by the service person for each of the plurality of image forming apparatus when the operation information is received;
reading, by the central control apparatus, prescribed operation history information from the stored operation information when a request for the operation history information is received from the mobile computer; and
transmitting the prescribed operation history information to the mobile computer.

13. The method as claimed in claim 12, further comprising the step of locating the central control apparatus at a service center.

14. The method as claimed in claim 12, further comprising the step of dispatching a service person to a user of a selected one of the plurality of image forming apparatus.

15. The method as claimed in claim 12, further comprising the steps of:
inputting operation status information related to an operation status of the service person into the mobile computer; and
informing the operation status information to the central control apparatus.

16. The method as claimed in claim 15, further comprising the step of including a security code in the operation status information so as to identify the mobile computer to the central control apparatus.

17. The method as claimed in claim 12, further comprising the steps of:
inputting service manual request information into the mobile computer; and
informing the service manual request information to the central control apparatus.

18. The method as claimed in claim 17, further comprising the steps of:
storing in the central control apparatus service manual information for each of the plurality of image forming apparatus;
reading, by the central control apparatus, prescribed service manual information when a request for the prescribed service manual information is received from the mobile computer; and
transmitting, by the central control apparatus, the prescribed service manual information to the mobile computer.

19. The method as claimed in claim 18, further comprising the steps of:
designating a prescribed image forming apparatus, which is to receive and print the prescribed service manual information; and
transmitting, by the central control apparatus, the prescribed service manual information to the prescribed image forming apparatus.

20. The method as claimed in claim 12, further comprising the steps of:
inputting operation result information into the mobile computer; and
informing the central control apparatus of the operation result information.

21. The method as claimed in claim 12, further comprising the steps of:
inputting into the mobile computer next user inquiry request information related to an inquiry of a next user to visit; and
informing the central control apparatus of the next user inquiry request information.

22. The method as claimed in claim 21, further comprising the steps of:
storing in the central control apparatus schedule information related to a schedule of each service person;
reading, by the central control apparatus, prescribed schedule information when the next user inquiry request information is received from the mobile computer; and
transmitting, by the central control apparatus, the prescribed schedule information corresponding to the next user inquiry request information to the mobile computer.

23. A system for supervising a plurality of image forming apparatus connected to a central control apparatus via a public communication network, comprising:
means for selectively connecting, either directly or indirectly, a mobile computer to a communication adaptor connected to the public communication network for executing communications of information between the central control apparatus and the mobile computer;
means for inputting operation history request information of a respective one of the plurality of image forming apparatus into the mobile computer;
means for informing the operation history request information to the central control apparatus;

means for storing in the central control apparatus operation information related to an operation executed by the service person for each of the plurality of image forming apparatus when the operation information is received;

means for reading, by the central control apparatus, prescribed operation history information from the stored operation information when a request for the operation history information is received from the mobile computer; and means for transmitting the prescribed operation history information to the mobile computer.

24. The system as claimed in claim 23, further comprising means for dispatching a service person to a user of a selected one of the plurality of image forming apparatus.

25. The system as claimed in claim 23, further comprising:

means for inputting operation status information related to an operation status of the service person into the mobile computer; and means for informing the operation status information to the central control apparatus.

26. The system as claimed in claim 25, further comprising means for including a security code in the operation status information so as to identify the mobile computer to the central control apparatus.

27. The system as claimed in claim 23, further comprising:

means for inputting service manual request information into the mobile computer; and means for informing the service manual request information to the central control apparatus.

28. The system as claimed in claim 27, further comprising:

means for storing in the central control apparatus service manual information for each of the plurality of image forming apparatus;

means for reading, by the central control apparatus, prescribed service manual information when a request for the prescribed service manual information is received from the mobile computer; and means for transmitting, by the central control apparatus, the prescribed service manual information to the mobile computer.

29. The system as claimed in claim 28, further comprising:

means for designating a prescribed image forming apparatus, which is to receive and print the prescribed service manual information; and means for transmitting, by the central control apparatus, the prescribed service manual information to the prescribed image forming apparatus.

30. The system as claimed in claim 23, further comprising:

means for inputting operation result information into the mobile computer; and means for informing the central control apparatus of the operation result information.

31. The system as claimed in claim 23, further comprising:

means for inputting into the mobile computer next user inquiry request information related to an inquiry of a next user to visit; and means for informing the central control apparatus of the next user inquiry request information.

32. The system as claimed in claim 31, further comprising:

means for storing in the central control apparatus schedule information related to a schedule of each service person;

means for reading, by the central control apparatus, prescribed schedule information when the next user inquiry request information is received from the mobile computer; and means for transmitting, by the central control apparatus, the prescribed schedule information corresponding to the next user inquiry request information to the mobile computer.

* * * * *